(12) United States Patent
Wise

(10) Patent No.: US 7,808,142 B2
(45) Date of Patent: Oct. 5, 2010

(54) MULTIVARIABLE GENERATOR AND METHOD OF USING THE SAME

(75) Inventor: Richard J. Wise, Kelowna (CA)

(73) Assignee: E3 Solutions, LLC, Fairfax, VA (US)

( * ) Notice: Subject to any disclaimer, the term of this patent is extended or adjusted under 35 U.S.C. 154(b) by 768 days.

(21) Appl. No.: 11/451,499

(22) Filed: Jun. 13, 2006

(65) Prior Publication Data

US 2006/0226725 A1   Oct. 12, 2006

Related U.S. Application Data

(63) Continuation-in-part of application No. 10/973,825, filed on Oct. 27, 2004, now abandoned.

(51) Int. Cl.
H02K 21/12 (2006.01)
(52) U.S. Cl. .................. 310/156.32; 310/268; 310/112
(58) Field of Classification Search ............ 310/89, 310/91, 156.32, 112, 26, 158–259, 268
See application file for complete search history.

(56) References Cited

U.S. PATENT DOCUMENTS

| | | |
|---|---|---|
| 1,863,294 A | 6/1932 | Bogia |
| 2,993,159 A | 7/1961 | Devol |
| 3,230,406 A | 1/1966 | Baudot |
| 3,247,407 A | 4/1966 | Bruneel |
| 3,331,973 A | 7/1967 | McClure |
| 3,531,709 A | 9/1970 | Nazare |
| 3,624,439 A | 11/1971 | Tokutomi |
| 3,832,581 A | 8/1974 | Hoffmann et al. |
| 3,869,626 A | 3/1975 | Puttock et al. |
| 4,007,386 A * | 2/1977 | Rustecki ..................... 310/166 |
| 4,104,552 A | 8/1978 | Tsergas |
| 4,207,487 A | 6/1980 | Beyersdorf |
| 4,303,843 A | 12/1981 | Arnoux et al. |
| 4,358,693 A | 11/1982 | Palmer et al. |
| 4,360,753 A | 11/1982 | Shannon |
| 4,456,858 A | 6/1984 | Loven |
| 4,486,675 A | 12/1984 | Albert |

(Continued)

FOREIGN PATENT DOCUMENTS

CA        2079056        3/1994

(Continued)

OTHER PUBLICATIONS

"NeoGen" An Axial PM Dynamo Project, Rex Hebert, www.magnetricity.com/NeoG.NeoGen_Dynamo.php, Aug. 23, 2005.

*Primary Examiner*—Thanh Lam
(74) *Attorney, Agent, or Firm*—Stuart I. Smith; Prass LLP

(57) ABSTRACT

A generator device for generating electrical energy includes a rotor having a first set of even-numbered of magnetic sources distributed along a first radius of the rotor, and a first pair of stators, each having a first set of odd-numbered coil members distributed along a first radius of the stator, the stators disposed adjacent to opposing side portions of the rotor, wherein each coil member includes a core portion having an amorphous structure. In addition, a generator device for generating electrical energy includes interchangeable rotor and stator pairs to provide variable voltage/current/frequency outputs.

26 Claims, 16 Drawing Sheets

U.S. PATENT DOCUMENTS

| | | | |
|---|---|---|---|
| 4,551,645 A | 11/1985 | Takahashi et al. |
| 4,578,610 A | 3/1986 | Kliman et al. |
| 4,751,486 A | 6/1988 | Minato |
| 4,866,321 A | 9/1989 | Blanchard et al. |
| 4,996,457 A | 2/1991 | Hawsey et al. |
| 5,117,141 A | 5/1992 | Hawsey et al. |
| 5,184,040 A | 2/1993 | Lim |
| 5,191,255 A | 3/1993 | Kloosterhouse et al. |
| 5,304,881 A | 4/1994 | Flynn et al. |
| 5,455,474 A | 10/1995 | Flynn |
| 5,463,263 A | 10/1995 | Flynn |
| 5,498,919 A | 3/1996 | Bahn |
| 5,514,923 A | 5/1996 | Gossler et al. |
| 5,594,289 A | 1/1997 | Minato |
| 5,619,087 A | 4/1997 | Sakai |
| 5,672,925 A | 9/1997 | Lipo et al. |
| 5,684,352 A | 11/1997 | Mita et al. |
| 5,731,649 A | 3/1998 | Caamaño |
| 5,786,645 A | 7/1998 | Obidniak |
| 5,793,137 A | 8/1998 | Smith |
| 5,814,914 A | 9/1998 | Caamaño |
| 5,903,082 A | 5/1999 | Caamaño |
| 5,917,261 A | 6/1999 | Kawai |
| 5,925,958 A | 7/1999 | Pirc |
| 5,962,942 A | 10/1999 | Pullen et al. |
| 5,982,070 A | 11/1999 | Caamaño |
| 5,982,074 A | 11/1999 | Smith et al. |
| 5,986,378 A | 11/1999 | Caamaño |
| 5,990,593 A | 11/1999 | Narita et al. |
| 6,025,667 A | 2/2000 | Narita et al. |
| 6,037,696 A | 3/2000 | Sromin et al. |
| 6,049,197 A | 4/2000 | Caamaño |
| 6,154,013 A | 11/2000 | Caamaño |
| 6,177,745 B1 | 1/2001 | Narita et al. |
| 6,239,524 B1 | 5/2001 | Leibowitz |
| 6,259,233 B1 | 7/2001 | Caamaño |
| 6,323,576 B1 | 11/2001 | Applegate |
| 6,373,162 B1 | 4/2002 | Liang et al. |
| 6,407,466 B2 | 6/2002 | Caamaño |
| 6,429,565 B1 | 8/2002 | Matsunobu et al. |
| 6,552,460 B2 | 4/2003 | Bales |
| 6,570,824 B1 | 5/2003 | Born |
| 6,605,883 B2 | 8/2003 | Isozaki et al. |
| 6,633,106 B1 | 10/2003 | Swett |
| 6,703,743 B2 | 3/2004 | Kaneko et al. |
| 6,717,324 B2 | 4/2004 | Chen |
| 6,762,526 B2 | 7/2004 | Isozaki et al. |
| 6,794,783 B2 | 9/2004 | Tu et al. |
| 6,803,696 B2 | 10/2004 | Chen |
| 6,849,984 B2 | 2/2005 | Gallant |
| 6,867,514 B2 | 3/2005 | Fecera |
| 6,891,306 B1 | 5/2005 | Soghomonian et al. |
| 2002/0153795 A1 | 10/2002 | Matsunobu et al. |
| 2003/0048033 A1 | 3/2003 | Kobayashi |
| 2004/0075358 A1 | 4/2004 | Furuse et al. |
| 2004/0135453 A1 | 7/2004 | Naito et al. |
| 2004/0150279 A1 | 8/2004 | Wise |
| 2005/0127767 A1 | 6/2005 | Gallant |

FOREIGN PATENT DOCUMENTS

| | | |
|---|---|---|
| CA | 2119934 | 4/2003 |
| GB | 2 094 560 | 9/1982 |
| JP | 2004-140937 | 5/2004 |

\* cited by examiner

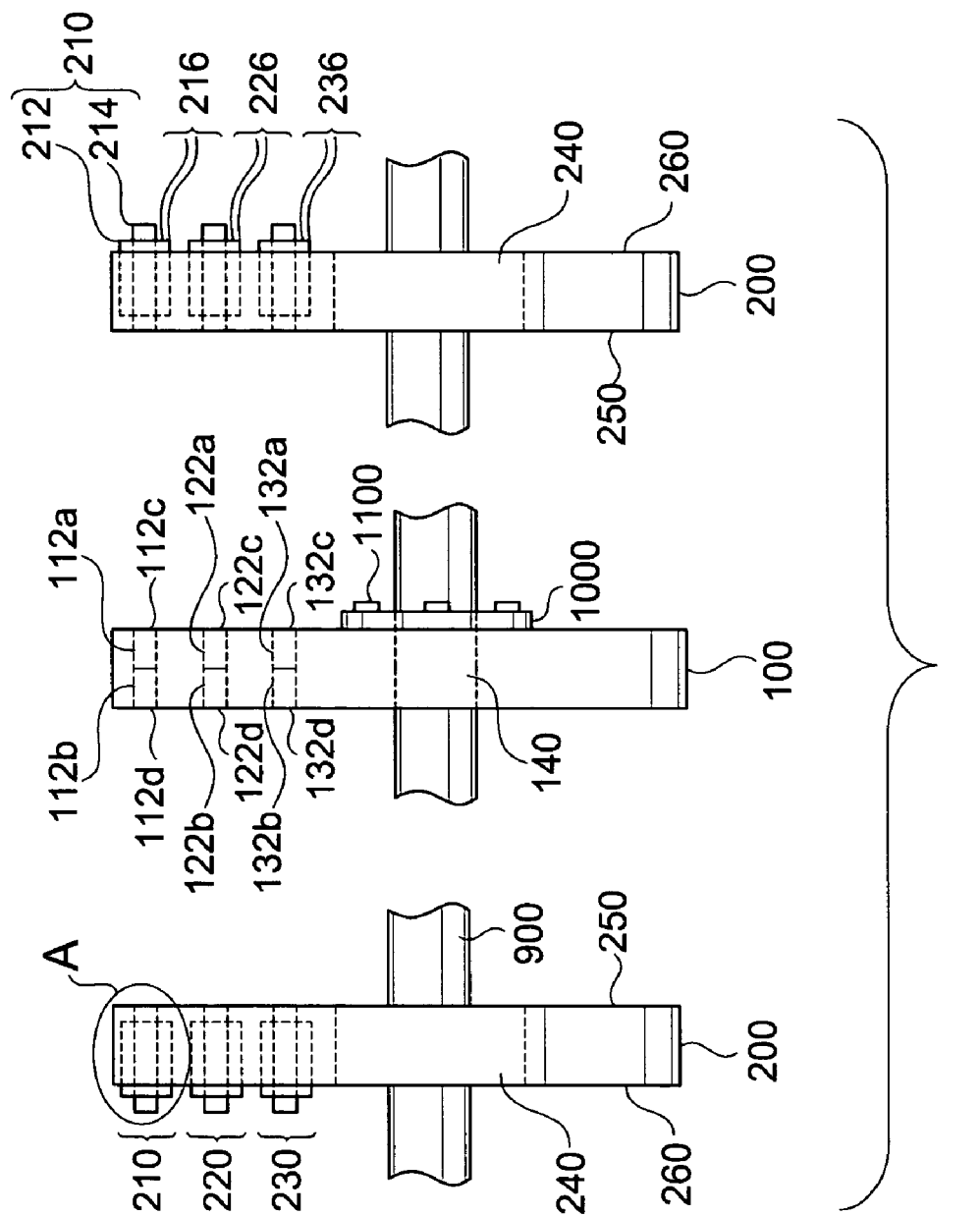

MULTIVARIABLE GENERATOR AND METHOD OF USING THE SAME

The present application is a Continuation-In-Part of U.S. patent application Ser. No. 10/973,825, filed on Oct. 27, 2004, now abandoned which is hereby incorporated by reference.

BACKGROUND OF THE INVENTION

1. Field of the Invention

The present invention relates to a generator and a method of using a generator, and particularly, to a multivariable generator and method of using a multivariable generator.

2. Discussion of the Related Art

In general, electrical generators generally include a plurality of magnets arranged to have alternating magnetic field orientations (i.e., North and South) that pass by a plurality of coil windings to generate electrical energy. Specifically, as the magnets become aligned with the core structure of the coil windings, a magnetic field is induced to the core structure thereby generating a current in the coil windings. In addition, as each alternating magnetic field passes by the core structure, induction of the alternating magnetic fields generates significant amounts of heat within the core structure, thus limiting output efficiency of the electrical generator and reducing the lifespan of the electrical generator. For example, the significant amounts of heat generated by the electrical generator causes an under-efficiency of the output of the generator. Thus, preventing the generation of heat by the core structures may significantly improve the under-efficiency of the output of the electrical generator.

Moreover, the generation of heat by the electrical generator results in scheduled periodic maintenance, wherein the electrical generator must be taken off-line, disassembled, inspected, and rebuilt. Thus, the periodic maintenance is costly and time consuming. Accordingly, by designing an electrical generator that reduces, if not eliminates, the generation of heat by the core structures, an electrical generator having a high output efficiency may be achieved, thereby improving on-line generation of electrical output.

In general, coil members used in electrical generators include core portions formed of iron oxide materials. However, since operation of the electrical generators use alternating magnet fields induced in the core portions of the coil members, significant amounts of heat are produced. Accordingly, continuous use of the electrical generator produces large amounts of heat that requires using either internal cooling systems or bulky heatsinks to dissipate the heat. Thus, the physical size of the electrical generator is directly dependent upon the size and amount of heat it produces. Correspondingly, as the size of the electrical generator increases so does the system for dissipating the heat generated by the alternating magnetic fields induced in the core portions of the coil members of the electrical generator.

According to the related art, electrical generators are designed and built to provide single voltage/current outputs that are invariable. Accordingly, if more than one voltage/current output is required, then the electrical generator must be taken off-line and replaced with another electrical generator capable of producing the desired voltage/current output. Thus, valuable time and energy is required if multiple voltage/current outputs are desired.

SUMMARY OF THE INVENTION

Accordingly, the present invention is directed to a multivariable generator and a method of using a multivariable generator that substantially obviates one or more of the problems due to limitations and disadvantages of the related art.

An object of the present invention is to provide a generator capable of generating a wide range of frequencies, voltages, and amperages.

Another object of the present invention is to provide a generator capable of having an increased operational lifespan.

Another object of the present invention is to provide a generator capable of reducing heat generation and improving efficiency.

Another object of the present invention is to provide a generator capable of efficiently being reconfigured to provide variable voltage/current outputs.

Another object of the present invention is to provide a method of using a generator capable of producing a wide range of frequencies, voltages, and amperages.

Another object of the present invention is to provide a method of using a generator capable of having an increased operational lifespan.

Another object of the present invention is to provide a method of using a generator capable of reducing heat generation and improving output efficiency.

Another object of the present invention is to provide a method of using a generator capable of efficiently being reconfigured to provide variable voltage/current outputs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a generator device for generating electrical energy includes a rotor having a first set of even-numbered of magnetic sources distributed along a first radius of the rotor, and a first pair of stators, each having a first set of odd-numbered coil members distributed along a first radius of the stator, the stators disposed adjacent to opposing side portions of the rotor, wherein each coil member includes a core portion having an amorphous structure.

In another aspect, a generator device includes a rotor having a first plurality of magnetic sources, a first stator having a first plurality of coil members, and a second stator having a second plurality of coil members, wherein the first and second stators are disposed adjacent to opposing sides of the rotor and the coil members extend from the stators along a direction away from the rotor.

In another aspect, a method of generating electrical energy includes rotating a rotor having an even number of magnetic sources between a first pair of stators having an odd number of coil members, wherein each of the coil members includes a core portion comprising manganese zinc ferrite material.

In another aspect, an apparatus for generating electrical energy includes a generator including a rotor and a first pair of stators disposed along opposing sides of the rotor, the generator producing an electrical output by rotation of the rotor with respect to the first pair of stators, wherein the rotor has an even-number of magnets and the first pair of stators have an odd-number of coil members extending through the stator along a direction away from the rotor.

In another aspect, an apparatus for generating electrical energy includes a rotor having a first even number of magnetic sources disposed along a first radius of the rotor, a second even number of magnetic source disposed along a second radius of the rotor less than the first radius, and a third even number of magnetic sources disposed along a third radius of the rotor less than the first and second radii, and a first pair of stators disposed along opposing sides of the rotor, each of the stators having a first odd number of coil members disposed along a first radius of the stator, a second odd number of coil member disposed along a second radius of the stator less than the first radius, and a third odd number of coil members disposed along a third radius of the stator less than the first and second radii, wherein each of the first, second, and third odd number of coil members extend through the stator along a direction opposite to the rotor.

In another aspect, an electrical generator includes a rotor, and at least one stator disposed adjacent to the rotor, wherein the stator includes a plurality of amorphous manganese zinc ferrite core portions and coil winding portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic plan view of an exemplary electrical generator according to the present invention;

DETAILED DESCRIPTION OF THE PREFERRED EMBODIMENTS

Figure 2A:
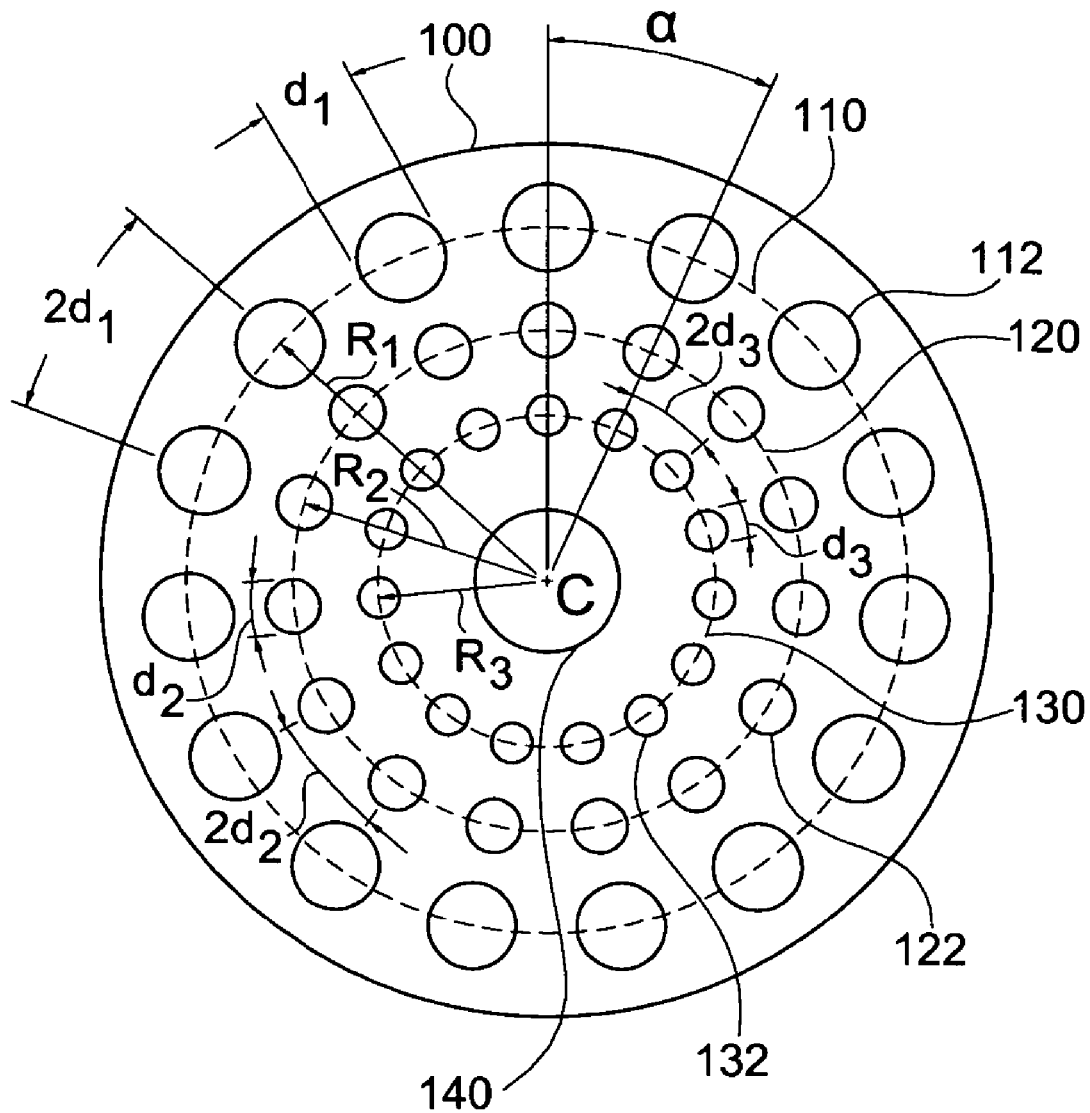
FIG. 2A is a schematic view of an exemplary rotor of a multivariable generator according to the present invention.

Reference will now be made in detail to the preferred embodiments of the present invention, examples of which are illustrated in the accompanying drawings.

FIG. 1 is a schematic plan view of an exemplary electrical generator according to the present invention. In FIG. 1, a generator may include a rotor 100 and a pair of stators 200 each disposed on opposing sides of the rotor 100. Each of the rotors 100 and the stators 200 may be made from non-magnetic materials. Alternatively, the generator may include a single rotor 100 and one stator 200 disposed at only one side of the single rotor 100. In addition, the rotor 100 may be mechanically coupled to a rotating shaft 900 using at least one coupling member 1000 having a plurality of fastening members 1100.

In FIG. 1, the rotor 100 may include a plurality of magnetic source pairs 112a/112b, 122a/122b, and 132a/132b disposed through a thickness of the rotor 100. Accordingly, each of the magnet source pairs 112a/112b, 122a/122b, and 132a/132b may include opposing magnetic surfaces. For example, the first magnet source pair 112a/112b may have opposing magnetic orientations, wherein the first magnet source pair surface 112c may have one of North and South magnetic orientation and the first magnetic source pair surface 112d may have one of South and North magnetic orientation. Thus the first magnetic source pair surfaces 112c and 112d have opposing magnetic orientations.

In FIG. 1, each of the magnet source pairs 112a/112b, 122a/122b, and 132a/132b may be replaced with a single magnet source provided through the thickness of the rotor 100 at each of the locations of the magnet source pairs 112a/112b, 122a/122b, and 132a/132b. In addition, each of the magnet source pairs 112a/112b, 122a/122b, and 132a/132b, or the alternative single magnet sources may be either press-fit into the rotor 100, or may be mechanically retained in the rotor 100. Moreover, each of the magnet source pairs 112a/112b, 122a/122b, and 132a/132b, or the alternative single magnet sources may be bonded within the rotor 100.

In FIG. 1, the first magnetic source members 112a/112b may be disposed along a first radius of the rotor 100, the second magnetic source members 122a/122b may be disposed along a second radius of the rotor 100, and third magnetic source members 132a/132b may be disposed along a third radius of the rotor 100.

In FIG. 1, each of the stators 200 may include a first plurality of coil members 210 each disposed along a first radius of the stator 200, a second plurality of coil members 220 each disposed along a second radius of the stator 200, and a third plurality of coil members 230 each disposed along a third radius of the stator 200. For example, each of the stators 200 may include an "n"-number of the first, second, and third coil members 210, 220, and 230, whereas the rotor 100 may include an "n+1"-number of the magnetic source members 110. In other words, the rotor 100 may include an even number of magnetic sources 110, and each of the stators 200 may include an odd number of coil members 210.

Although not specifically shown, the rotor 100 may include an odd number of magnetic sources 110, and each of the stators 200 may include an even number of coil members 210. Accordingly, so long as the "cogging effect" is prevented, i.e., equal numbers of magnetic sources and coil members simultaneously aligned with each other, then the total numbers of magnetic sources and coil members may be varied depending on the desired voltage/current/frequency output.

Figure 6:
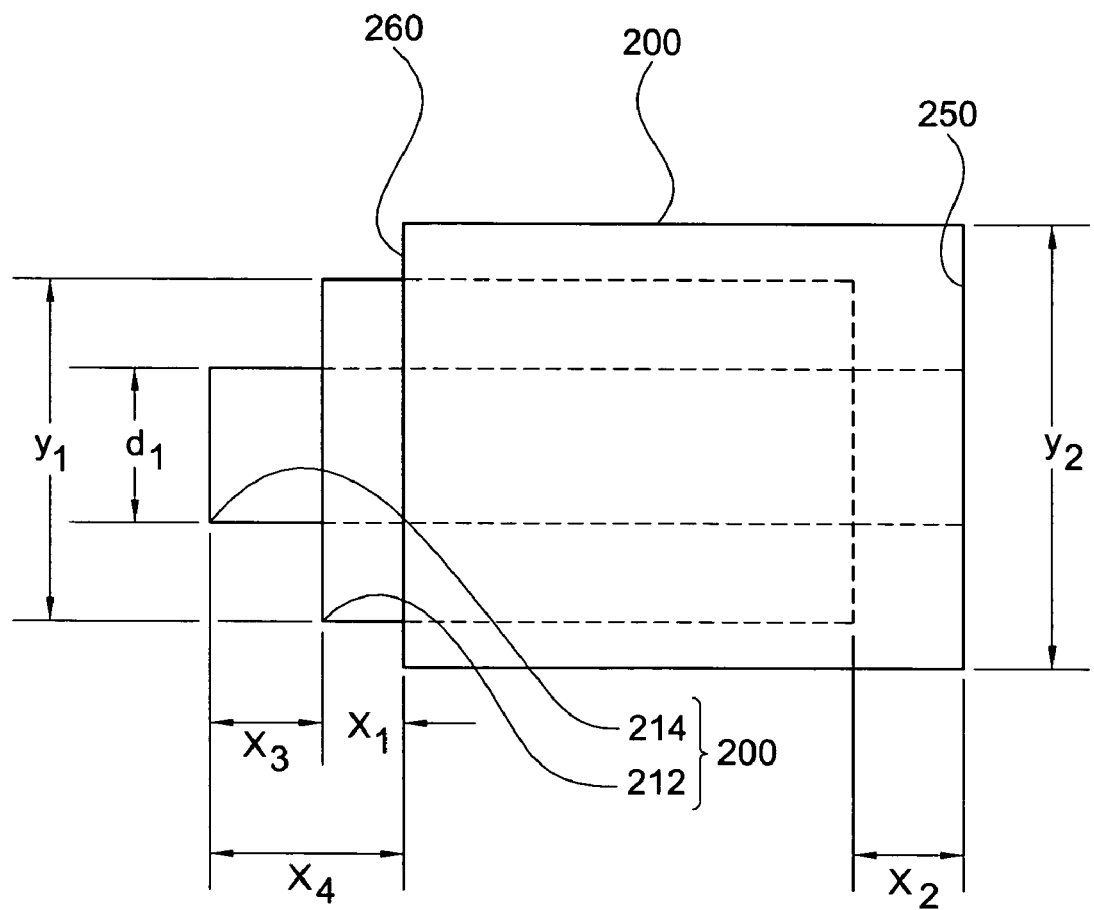
FIG. 6 is an enlarged view of section A of FIG. 1 showing a schematic view of an exemplary coil member of an electrical generator according to the present invention.

As shown in FIG. 1, each of the coil members 210, 220, and 230 may include a coil winding portion disposed concentrically around a core portion. For example, as shown in FIG. 6, the coil member 210 may include a coil winding portion 212 disposed concentrically around a core portion 214. The core portion 214 may be disposed so as to have a first end portion extending past a first end region of the coil winding portion 230, and a second end portion extending to be flush with an interior surface 250 of the stator 200. In addition, the coil winding portion 212 may include a first end region extending into the stator 200, but offset from the interior surface 250 of the stator 200. Similarly, the coil winding portion 212 may extend past an exterior surface 260 of the stator 200. Accordingly, both the coil winding portion 212 and the core portion 214 may extend past the exterior surface 260 of the stator 200.

Accordingly, diamagnetic opposition to the coil winding portion 212 (in FIG. 6) of the coil member 210 may be prevented by offsetting the second end region of the coil winding portion 212 from the interior surface 250 of the stator 200. The stator 200 may further include a through-hole 240 to accommodate the rotating shaft 900 of the rotor 100. In addition, the through-hole 240 may be used for alignment of the rotating shaft 900 of the rotor 100.

In FIG. 1, each of the coil winding portions of each of the coil members 210, 220, and 230 of the stator 200 may include at least two conductive leads 216, 226, and 236 that may be electrically connected to a control system. Accordingly, the current induced to the coiling winding portions of each of the coil members 210, 220, and 230 may be fed to the control system for controlling an output of the generator. Although the coil winding portions of each of the coil members 210, 220, and 230 may include two conductive leads 216, 226, and 236, each of the coil winding portions of each of the coil members 210, 220, and 230 may include multiple "taps" having a plurality of conductive leads.

FIG. 2A is a schematic view of an exemplary rotor of a multivariable generator according to the present invention. In FIG. 2A, a generator rotor 100 may include the first plurality of magnetic sources 112 distributed to be equally spaced apart along the first radius 110 around the rotor 100. For example, each of the first plurality of magnetic sources 112 may have a diameter d1 and may be spaced apart from each other by a distance 2$d$1 between adjacent magnetic sources 112. Accordingly, each of the first plurality of magnetic sources 112 may be mutually spaced apart from each other by a distance equal to the diameter of the first magnetic sources 112, and the center of each of the first plurality of magnetic sources 112 may be disposed from the center C of the rotor 100 by a radius R1.

In FIG. 2A, the generator rotor 100 may include the second plurality of magnetic sources 122 distributed to be equally spaced apart along the second radius 120 around the rotor 100. For example, each of the second plurality of magnetic sources 122 may have a diameter d2 and may be spaced apart from each other by a distance 2$d$2 between adjacent magnetic sources 122. Accordingly, each of the second plurality of magnetic sources 122 may be mutually spaced apart from each other by a distance equal to the diameter of the second magnetic sources 122, and the center of each of the second plurality of magnetic sources 122 may be disposed from the center C of the rotor 100 by a radius R2.

In FIG. 2A, the generator rotor 100 may include the third plurality of magnetic sources 132 distributed to be equally spaced apart along the third radius 130 around the rotor 100. For example, each of the third plurality of magnetic sources 132 may have a diameter d3 and may be spaced apart from each other by a distance 2$d$3 between adjacent magnetic sources 132. Accordingly, each of the third plurality of magnetic sources 132 may be mutually spaced apart from each other by a distance equal to the diameter of the third magnetic sources 132, and the center of each of the third plurality of magnetic sources 132 may be disposed from the center C of the rotor 100 by a radius R3.

In FIG. 2A, spacings between each of the first, second, and third radii R1, R2, and R3 may be determined by each of the diameters d1, d2, and d3 of the first, second, and third pluralities of magnetic sources. Furthermore, the coil winding portions of each of the first, second, and third coil members 210, 220, and 230 (in FIG. 1) may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 2A, each of the first, second, and third pluralities of magnetic sources 112, 122, and 132 are radially disposed to be mutually separated by an angle $\alpha$ of about 22.5 degrees (i.e., 360 degrees/16 magnet sources).

Figure 2B:
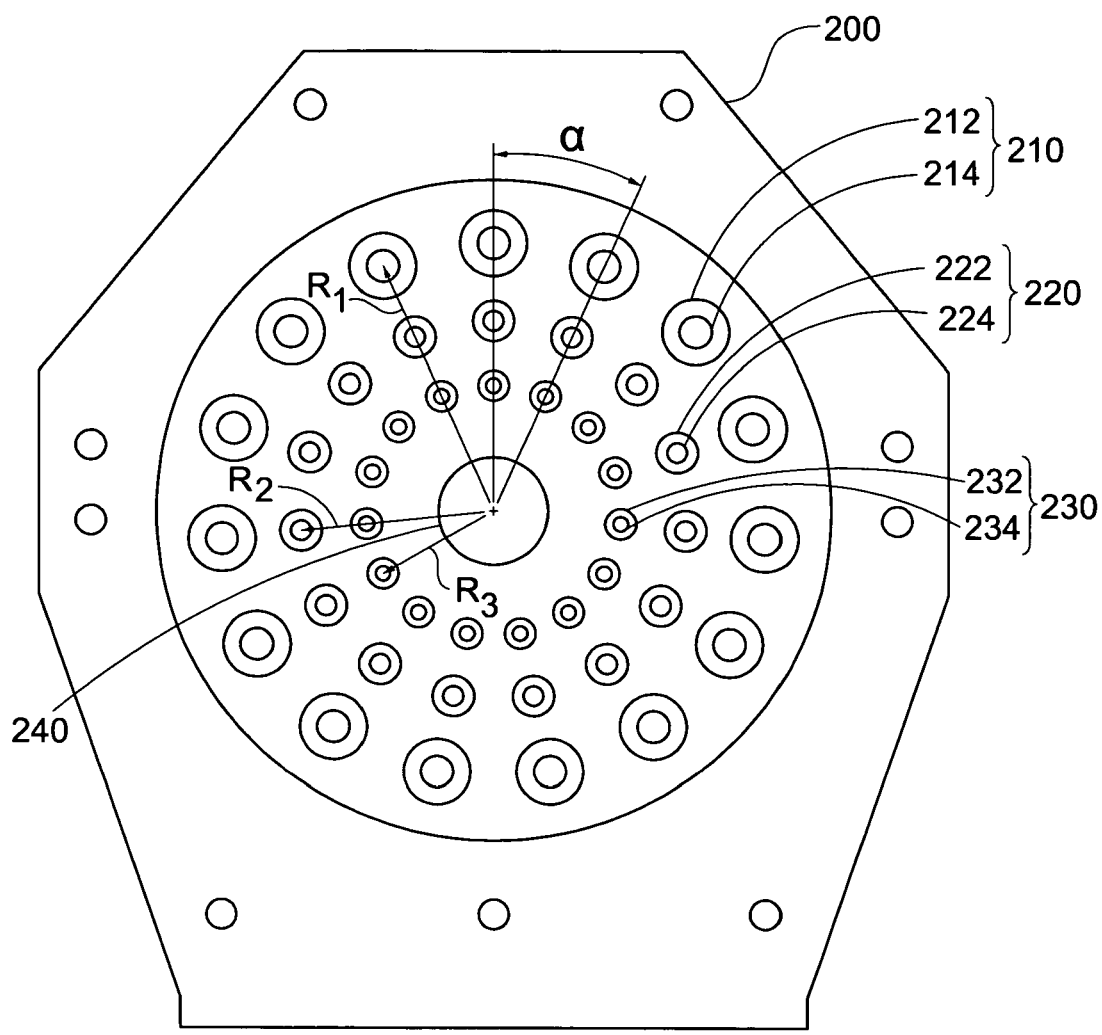
FIG. 2B is a schematic view of an exemplary stator of a multivariable generator corresponding to the exemplary rotor of FIG. 2A according to the present invention.

FIG. 2B is a schematic view of an exemplary stator of a multivariable generator corresponding to the exemplary rotor of FIG. 2A according to the present invention. In FIG. 2B, the stator 200 may include a first plurality of coil members 210 distributed to be equally spaced apart along a first radius R1 around the stator 200 similar to the distribution of the first plurality of magnetic sources 112 along the first radius R1 around the rotor 100 (in FIG. 2A). Accordingly, each of the first plurality of coil members 210 may be mutually spaced apart from each other by a distance corresponding to the center of each of the first plurality of magnetic sources 112.

In FIG. 2B, the stator 200 may include a second plurality of coil members 220 distributed to be equally spaced apart along a second radius R2 around the stator 200 similar to the distribution of the second plurality of magnetic sources 122 along the second radius R2 around the rotor 100 (in FIG. 2A). Accordingly, each of the second plurality of coil members 220 may be mutually spaced apart from each other by a distance corresponding to the center of each of the second plurality of magnetic sources 122.

In FIG. 2B, the stator 200 may include a third plurality of coil members 230 distributed to be equally spaced apart along a third radius R3 around the stator 200 similar to the distribution of the third plurality of magnetic sources 132 along the third radius R3 around the rotor 100 (in FIG. 2A). Accordingly, each of the third plurality of coil members 230 may be mutually spaced apart from each other by a distance corresponding to the center of each of the third plurality of magnetic sources 132.

In FIG. 2B, spacings between each of the first, second, and third radii R1, R2, and R3 may be determined by each of the diameters d1, d2, and d3 of the first, second, and third pluralities of magnetic sources 112, 122, and 132 (in FIG. 2A). Furthermore, the coil winding portions of each of the first, second, and third coil members 210, 220, and 230 may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 2B, each of the first, second, and third pluralities of coil members 210, 220, and 320 are radially disposed to be mutually separated by an angle α of about 24.0 degrees (i.e., 360 degrees/15 coil members).

Figure 3A:
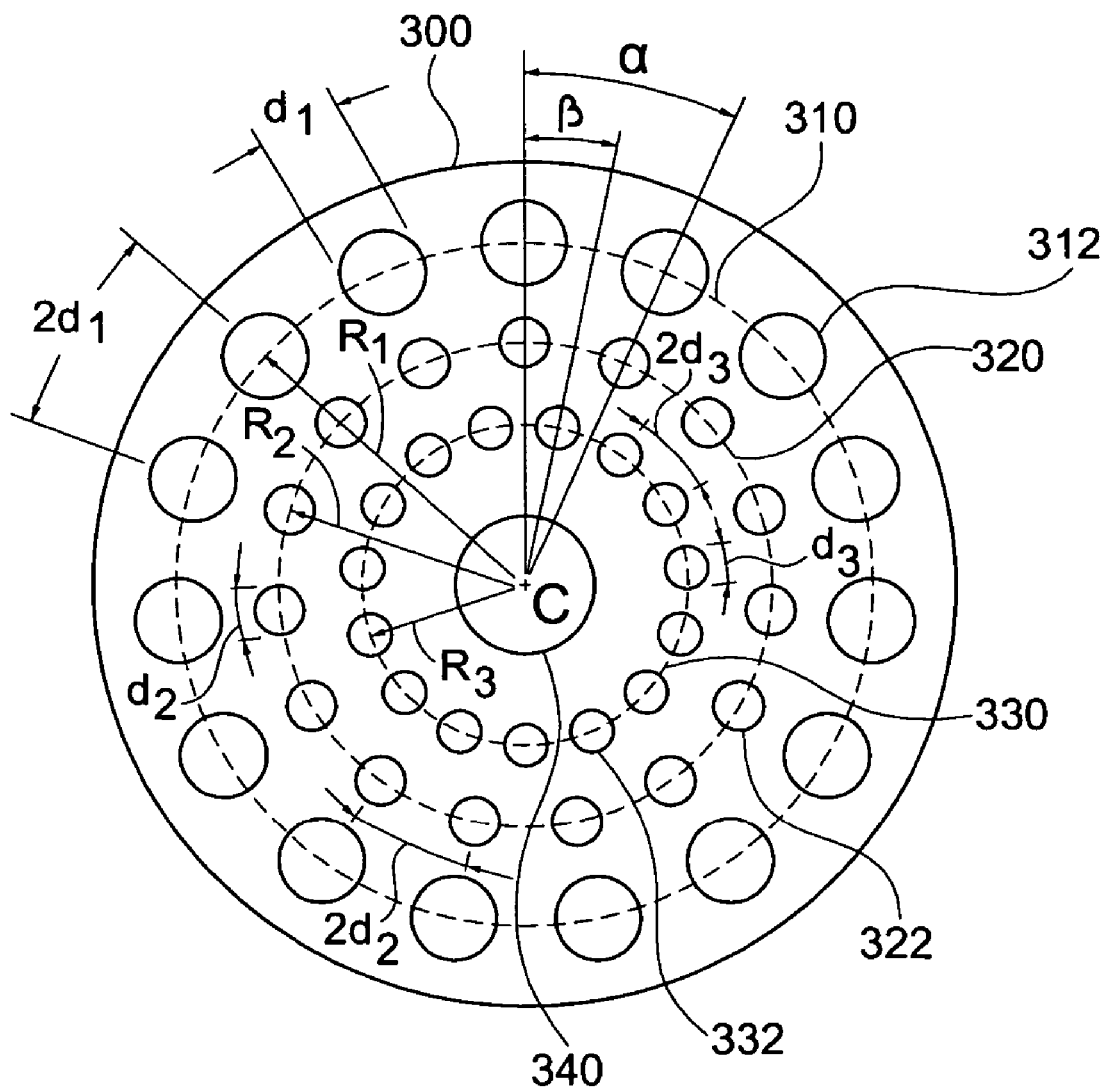
FIG. 3A is a schematic view of another exemplary rotor of a multivariable generator according to the present invention.

FIG. 3A is a schematic view of another exemplary rotor of a multivariable generator according to the present invention. In FIG. 3A, a generator rotor 300 may include the first plurality of magnetic sources 312 distributed to be equally spaced apart along the first radius 310 around the rotor 300. For example, each of the first plurality of magnetic sources 312 may have a diameter d1 and may be spaced apart from each other by a distance 2d1 between adjacent magnetic sources 312. Accordingly, each of the first plurality of magnetic sources 312 may be mutually spaced apart from each other by a distance equal to the diameter of the first magnetic sources 312, and the center of each of the first plurality of magnetic sources 312 may be disposed from the center C of the rotor 300 by a radius R1.

In FIG. 3A, the generator rotor 100 may include the second plurality of magnetic sources 322 distributed to be equally spaced apart along the second radius 320 around the rotor 300. For example, each of the second plurality of magnetic sources 322 may have a diameter d2 and may be spaced apart from each other by a distance 2d2 between adjacent magnetic sources 322. Accordingly, each of the second plurality of magnetic sources 322 may be mutually spaced apart from each other by a distance equal to the diameter of the second magnetic sources 322, and the center of each of the second plurality of magnetic sources 322 may be disposed from the center C of the rotor 300 by a radius R2.

In FIG. 3A, the generator rotor 300 may include the third plurality of magnetic sources 332 distributed to be equally spaced apart along the third radius 330 around the rotor 300. For example, each of the third plurality of magnetic sources 332 may have a diameter d3 and may be spaced apart from each other by a distance 2d3 between adjacent magnetic sources 332. Accordingly, each of the third plurality of magnetic sources 332 may be mutually spaced apart from each other by a distance equal to the diameter of the third magnetic sources 332, and the center of each of the third plurality of magnetic sources 332 may be disposed from the center C of the rotor 300 by a radius R3.

In FIG. 3A, spacings between each of the first, second, and third radii R1, R2, and R3 may be determined by each of the diameters d1, d2, and d3 of the first, second, and third pluralities of magnetic sources. Furthermore, the coil winding portions of each of the first, second, and third coil members 210, 220, and 230 (in FIG. 1) may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 3A, each of the first, second, and third pluralities of magnetic sources 312, 322, and 332 are radially disposed to be mutually separated by an angle α of about 22.5 degrees (i.e., 360 degrees/16 magnet sources). In addition, the radial placement of the third plurality of magnetic sources 332 may be offset from the first and second pluralities of magnetic sources 312 and 322, by an angle β that may be between about 0 degrees and 22.5 degrees. Accordingly, different frequencies may be produced by the third plurality of magnetic source/coil members than the frequencies produced by the first and second pluralities of source/coil members.

Figure 3B:
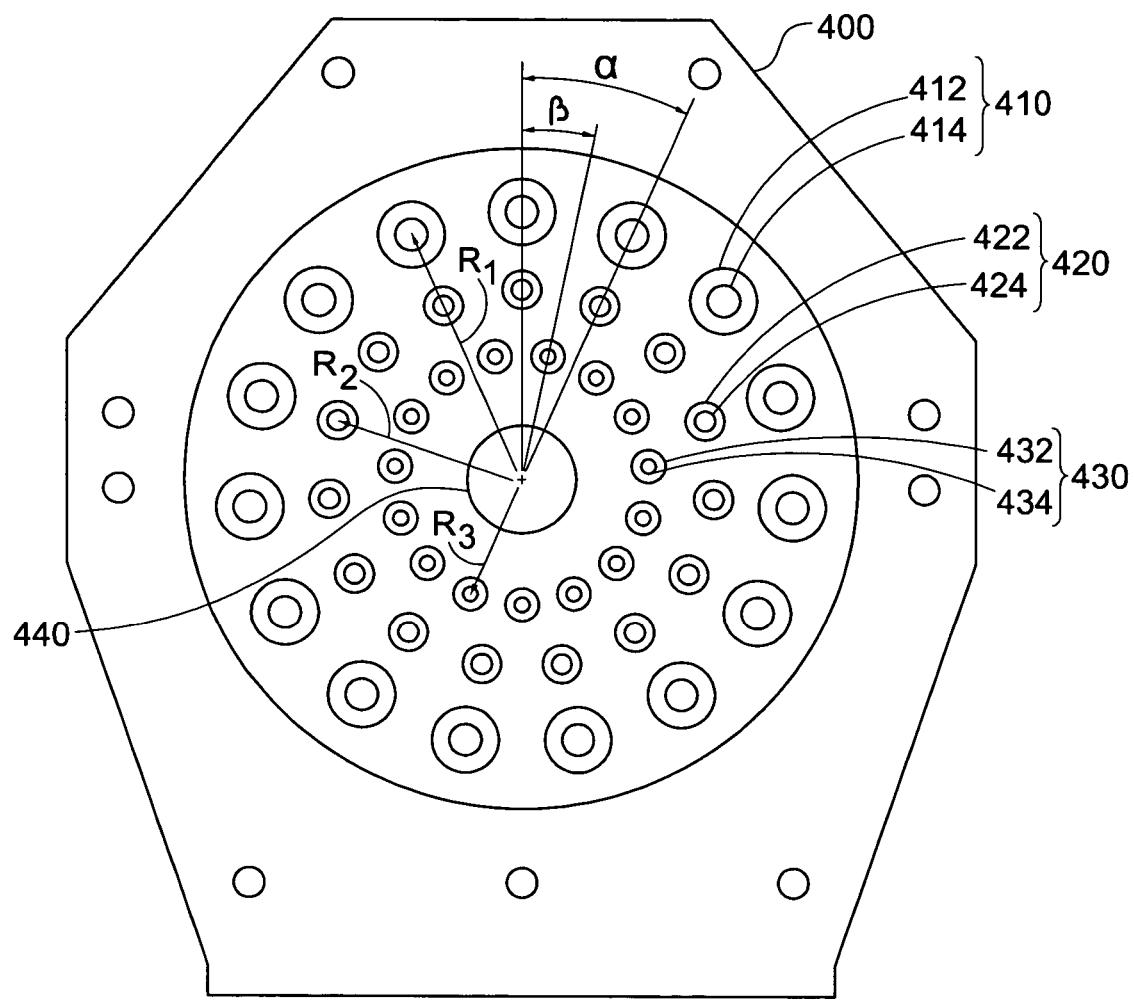
FIG. 3B is a schematic view of another exemplary stator of a multivariable generator corresponding to the exemplary rotor of FIG. 3A according to the present invention.

FIG. 3B is a schematic view of another exemplary stator of a multivariable generator corresponding to the exemplary rotor of FIG. 3A according to the present invention. In FIG. 3B, the stator 400 may include a first plurality of coil members 410 distributed to be equally spaced apart along a first radius R1 around the stator 400 similar to the distribution of the first plurality of magnetic sources 312 along the first radius R1 around the rotor 300 (in FIG. 3A). Accordingly, each of the first plurality of coil members 410 may be mutually spaced apart from each other by a distance corresponding to the center of each of the first plurality of magnetic sources 312.

In FIG. 3B, the stator 400 may include a second plurality of coil members 420 distributed to be equally spaced apart along a second radius R2 around the stator 400 similar to the distribution of the second plurality of magnetic sources 322 along the second radius R2 around the rotor 300 (in FIG. 3A). Accordingly, each of the second plurality of coil members 320 may be mutually spaced apart from each other by a distance corresponding to the center of each of the second plurality of magnetic sources 322.

In FIG. 3B, the stator 400 may include a third plurality of coil members 430 distributed to be equally spaced apart along a third radius R3 around the stator 400 similar to the distribution of the third plurality of magnetic sources 332 along the third radius R3 around the rotor 300 (in FIG. 3A). Accordingly, each of the third plurality of coil members 430 may be mutually spaced apart from each other by a distance corresponding to the center of each of the third plurality of magnetic sources 332.

In FIG. 3B, spacings between each of the first, second, and third radii R1, R2, and R3 may be determined by each of the diameters d1, d2, and d3 of the first, second, and third pluralities of magnetic sources 312, 322, and 332 (in FIG. 3A). Furthermore, the coil winding portions of each of the first, second, and third coil members 410, 420, and 430 may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 3B, each of the first, second, and third pluralities of coil members 410, 420, and 420 are radially disposed to be mutually separated by an angle α of about 24.0 degrees (i.e., 360 degrees/15 coil members). In addition, the radial placement of the third plurality of coil members 430 may be offset from the first and second pluralities of coil members 410 and 420, by an angle β that may be between about 0 degrees and 24.0 degrees. Accordingly, different frequencies may be produced by the third plurality of coil members/magnetic sources than the frequencies produced by the first and second pluralities of coil members/magnetic sources.

Figure 4A:
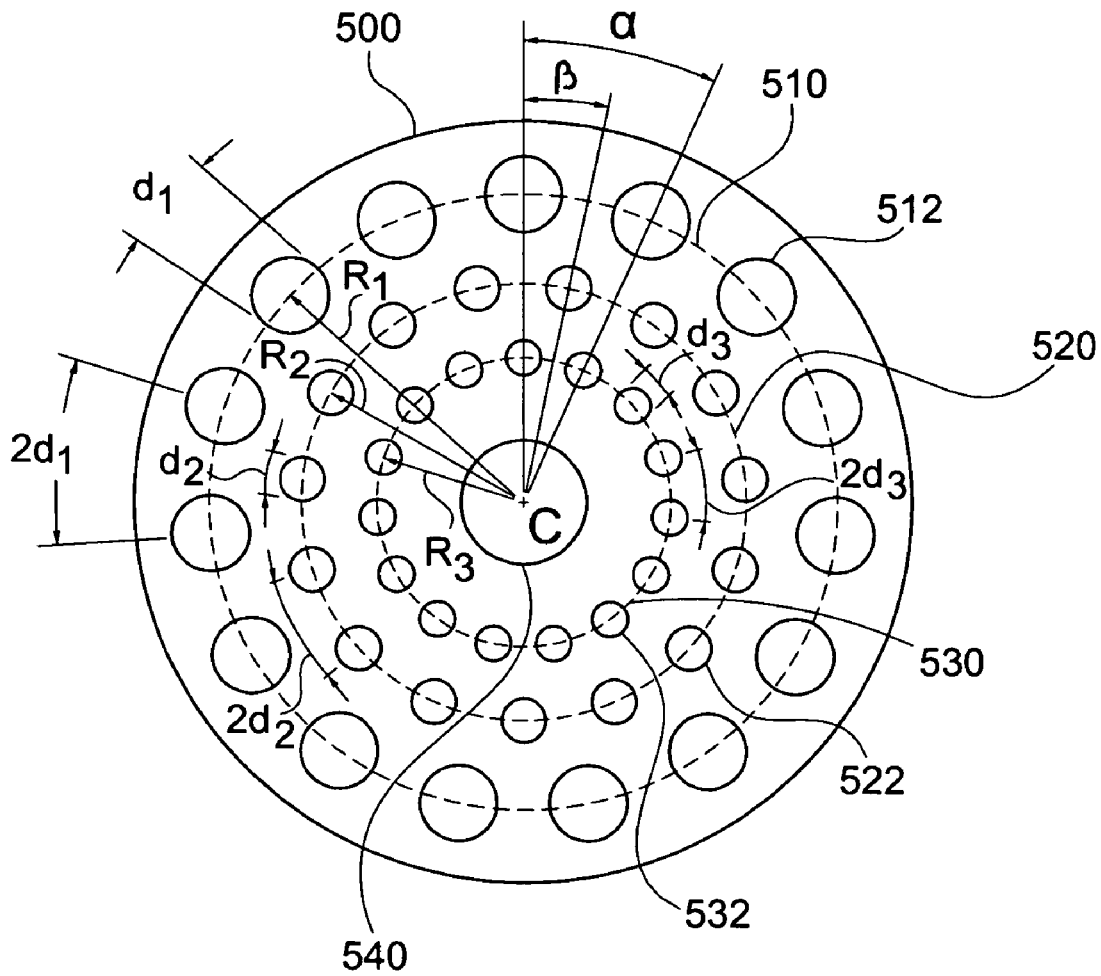
FIG. 4A is a schematic view of another exemplary rotor of a multivariable generator according to the present invention.

FIG. 4A is a schematic view of another exemplary rotor of a multivariable generator according to the present invention. In FIG. 4A, a generator rotor 500 may include the first plurality of magnetic sources 512 distributed to be equally spaced apart along the first radius 510 around the rotor 500. For example, each of the first plurality of magnetic sources 512 may have a diameter d1 and may be spaced apart from each other by a distance 2d1 between adjacent magnetic sources 512. Accordingly, each of the first plurality of magnetic sources 512 may be mutually spaced apart from each other by a distance equal to the diameter of the first magnetic sources 512, and the center of each of the first plurality of magnetic sources 512 may be disposed from the center C of the rotor 500 by a radius R1.

In FIG. 4A, the generator rotor 500 may include the second plurality of magnetic sources 522 distributed to be equally spaced apart along the second radius 520 around the rotor 500. For example, each of the second plurality of magnetic sources 522 may have a diameter d2 and may be spaced apart from each other by a distance 2d2 between adjacent magnetic sources 522. Accordingly, each of the second plurality of magnetic sources 522 may be mutually spaced apart from each other by a distance equal to the diameter of the second magnetic sources 522, and the center of each of the second plurality of magnetic sources 522 may be disposed from the center C of the rotor 500 by a radius R2.

In FIG. 4A, the generator rotor 500 may include the third plurality of magnetic sources 532 distributed to be equally spaced apart along the third radius 530 around the rotor 500. For example, each of the third plurality of magnetic sources 532 may have a diameter d3 and may be spaced apart from each other by a distance 2d3 between adjacent magnetic sources 532. Accordingly, each of the third plurality of magnetic sources 532 may be mutually spaced apart from each other by a distance equal to the diameter of the third magnetic sources 532, and the center of each of the third plurality of magnetic sources 532 may be disposed from the center C of the rotor 500 by a radius R3.

In FIG. 4A, spacings between each of the first, second, and third radii R1, R2, and R3 may be determined by each of the diameters d1, d2, and d3 of the first, second, and third pluralities of magnetic sources. Furthermore, the coil winding portions of each of the first, second, and third coil members 210, 220, and 230 (in FIG. 1) may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 4A, each of the first, second, and third pluralities of magnetic sources 512, 522, and 532 are radially disposed to be mutually separated by an angle α of about 22.5 degrees (i.e., 360 degrees/16 magnet sources). In addition, the radial placement of the second plurality of magnetic sources 522 may be offset from the first and third pluralities of magnetic sources 512 and 532, by an angle β that may be between about 0 degrees and 22.5 degrees. Accordingly, different frequencies may be produced by the second plurality of magnetic source/coil members than the frequencies produced by the first and third pluralities of source/coil members.

Figure 4B:
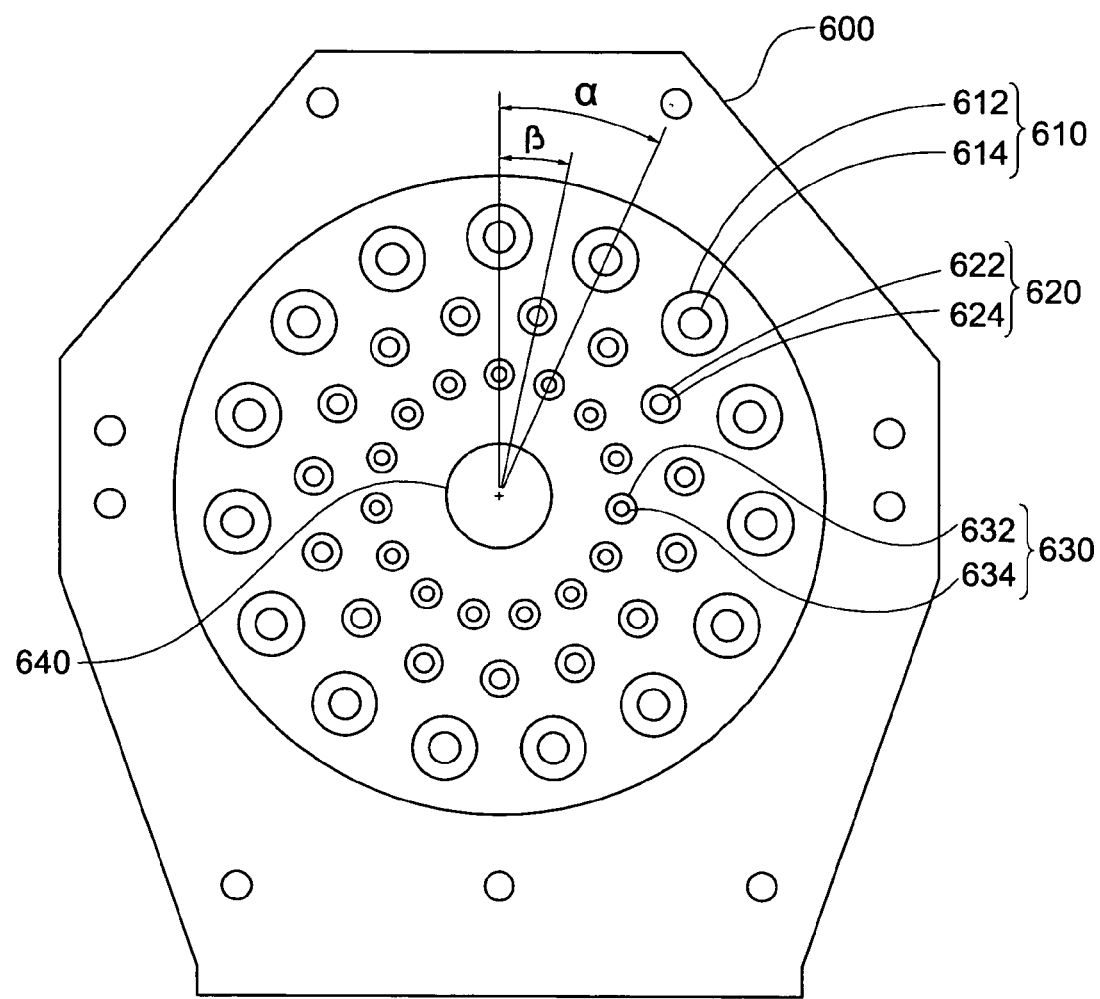
FIG. 4B is a schematic view of another exemplary stator of a multivariable generator corresponding to the exemplary rotor of FIG. 4A according to the present invention.

FIG. 4B is a schematic view of another exemplary stator of a multivariable generator corresponding to the exemplary rotor of FIG. 4A according to the present invention. In FIG. 4B, the stator 600 may include a first plurality of coil members 610 distributed to be equally spaced apart along a first radius R1 around the stator 600 similar to the distribution of the first plurality of magnetic sources 612 along the first radius R1 around the rotor 600 (in FIG. 4A). Accordingly, each of the first plurality of coil members 610 may be mutually spaced apart from each other by a distance corresponding to the center of each of the first plurality of magnetic sources 512.

In FIG. 4B, the stator 600 may include a second plurality of coil members 620 distributed to be equally spaced apart along a second radius R2 around the stator 600 similar to the distribution of the second plurality of magnetic sources 522 along the second radius R2 around the rotor 500 (in FIG. 4A). Accordingly, each of the second plurality of coil members 620 may be mutually spaced apart from each other by a distance corresponding to the center of each of the second plurality of magnetic sources 522.

In FIG. 4B, the stator 600 may include a third plurality of coil members 630 distributed to be equally spaced apart along a third radius R3 around the stator 600 similar to the distribution of the third plurality of magnetic sources 532 along the third radius R3 around the rotor 500 (in FIG. 4A). Accordingly, each of the third plurality of coil members 630 may be mutually spaced apart from each other by a distance corresponding to the center of each of the third plurality of magnetic sources 532.

In FIG. 4B, spacings between each of the first, second, and third radii R1, R2, and R3 may be determined by each of the diameters d1, d2, and d3 of the first, second, and third pluralities of magnetic sources 512, 522, and 532 (in FIG. 4A). Furthermore, the coil winding portions of each of the first, second, and third coil members 610, 620, and 630 may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 4B, each of the first, second, and third pluralities of coil members 610, 620, and 630 are radially disposed to be mutually separated by an angle α of about 24.0 degrees (i.e., 360 degrees/15 coil members). In addition, the radial placement of the second plurality of coil members 620 may be offset from the first and third pluralities of coil members 610 and 630, by an angle β that may be between about 0 degrees and 24.0 degrees. Accordingly, different frequencies may be produced by the second plurality of coil members/magnetic sources than the frequencies produced by the first and third pluralities of coil members/magnetic sources.

Figure 5A:
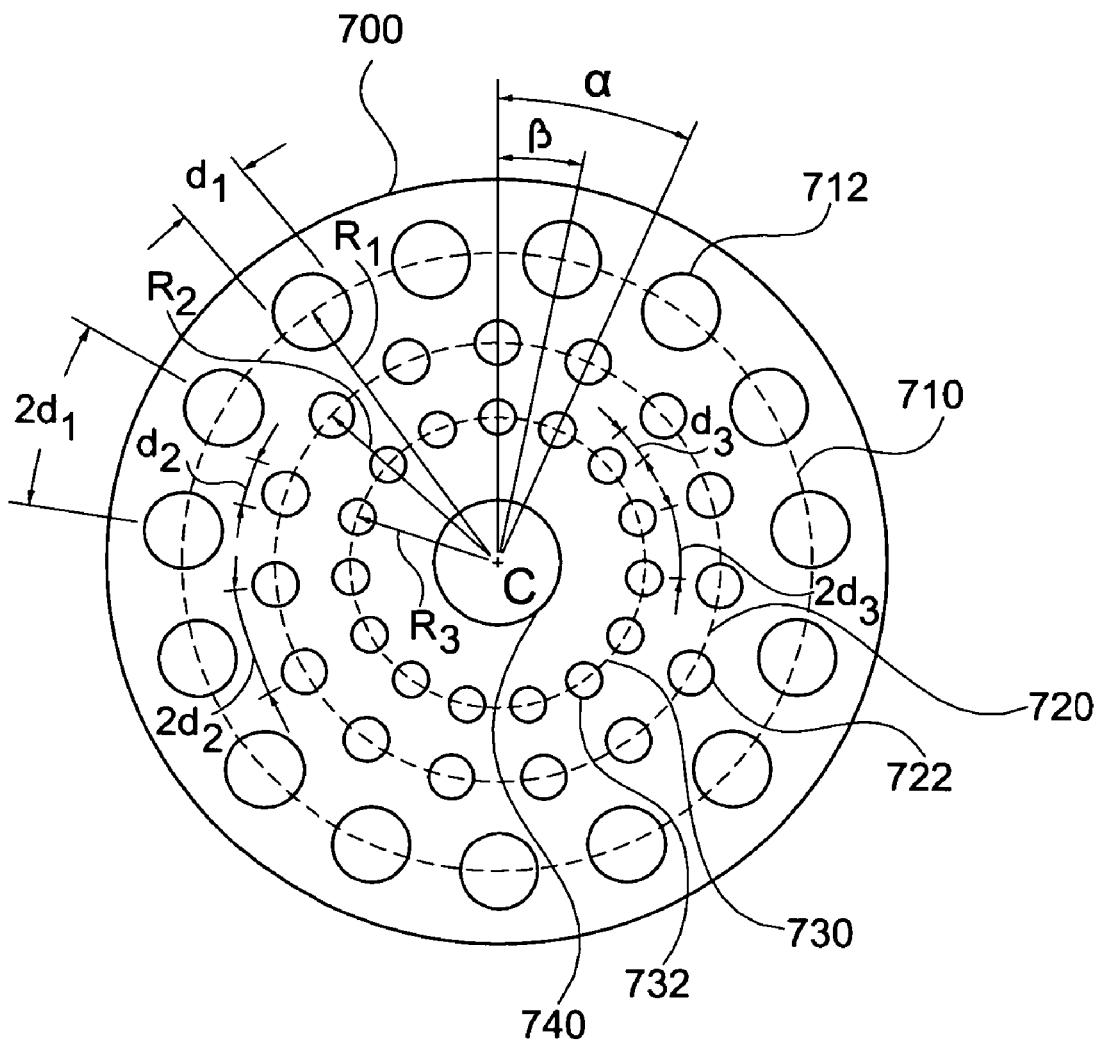
FIG. 5A is a schematic view of another exemplary rotor of a multivariable generator according to the present invention.

FIG. 5A is a schematic view of another exemplary rotor of a multivariable generator according to the present invention. In FIG. 5A, a generator rotor 700 may include the first plurality of magnetic sources 712 distributed to be equally spaced apart along the first radius 710 around the rotor 700. For example, each of the first plurality of magnetic sources 712 may have a diameter d1 and may be spaced apart from each other by a distance 2d1 between adjacent magnetic sources 712. Accordingly, each of the first plurality of magnetic sources 712 may be mutually spaced apart from each other by a distance equal to the diameter of the first magnetic sources 712, and the center of each of the first plurality of magnetic sources 712 may be disposed from the center C of the rotor 700 by a radius R1.

In FIG. 5A, the generator rotor 700 may include the second plurality of magnetic sources 722 distributed to be equally spaced apart along the second radius 720 around the rotor 700. For example, each of the second plurality of magnetic sources 722 may have a diameter d2 and may be spaced apart from each other by a distance 2d2 between adjacent magnetic sources 722. Accordingly, each of the second plurality of magnetic sources 722 may be mutually spaced apart from each other by a distance equal to the diameter of the second magnetic sources 722, and the center of each of the second plurality of magnetic sources 722 may be disposed from the center C of the rotor 700 by a radius R2.

In FIG. 5A, the generator rotor 700 may include the third plurality of magnetic sources 732 distributed to be equally spaced apart along the third radius 730 around the rotor 700. For example, each of the third plurality of magnetic sources 732 may have a diameter d3 and may be spaced apart from each other by a distance 2d3 between adjacent magnetic sources 732. Accordingly, each of the third plurality of magnetic sources 732 may be mutually spaced apart from each other by a distance equal to the diameter of the third magnetic sources 732, and the center of each of the third plurality of magnetic sources 732 may be disposed from the center C of the rotor 700 by a radius R3.

In FIG. 5A, spacings between each of the first, second, and third radii R1, R2, and R3 may be determined by each of the diameters d1, d2, and d3 of the first, second, and third pluralities of magnetic sources. Furthermore, the coil winding portions of each of the first, second, and third coil members 210, 220, and 230 (in FIG. 1) may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 5A, each of the first, second, and third pluralities of magnetic sources 712, 722, and 732 are radially disposed to be mutually separated by an angle α of about 22.5 degrees (i.e., 360 degrees/16 magnet sources). In addition, the radial placement of the first plurality of magnetic sources 712 may be offset from the second and third pluralities of magnetic sources 722 and 732, by an angle β that may be between about 0 degrees and 22.5 degrees. Accordingly, different frequencies may be produced by the first plurality of magnetic source/coil members than the frequencies produced by the second and third pluralities of source/coil members.

Figure 5B:
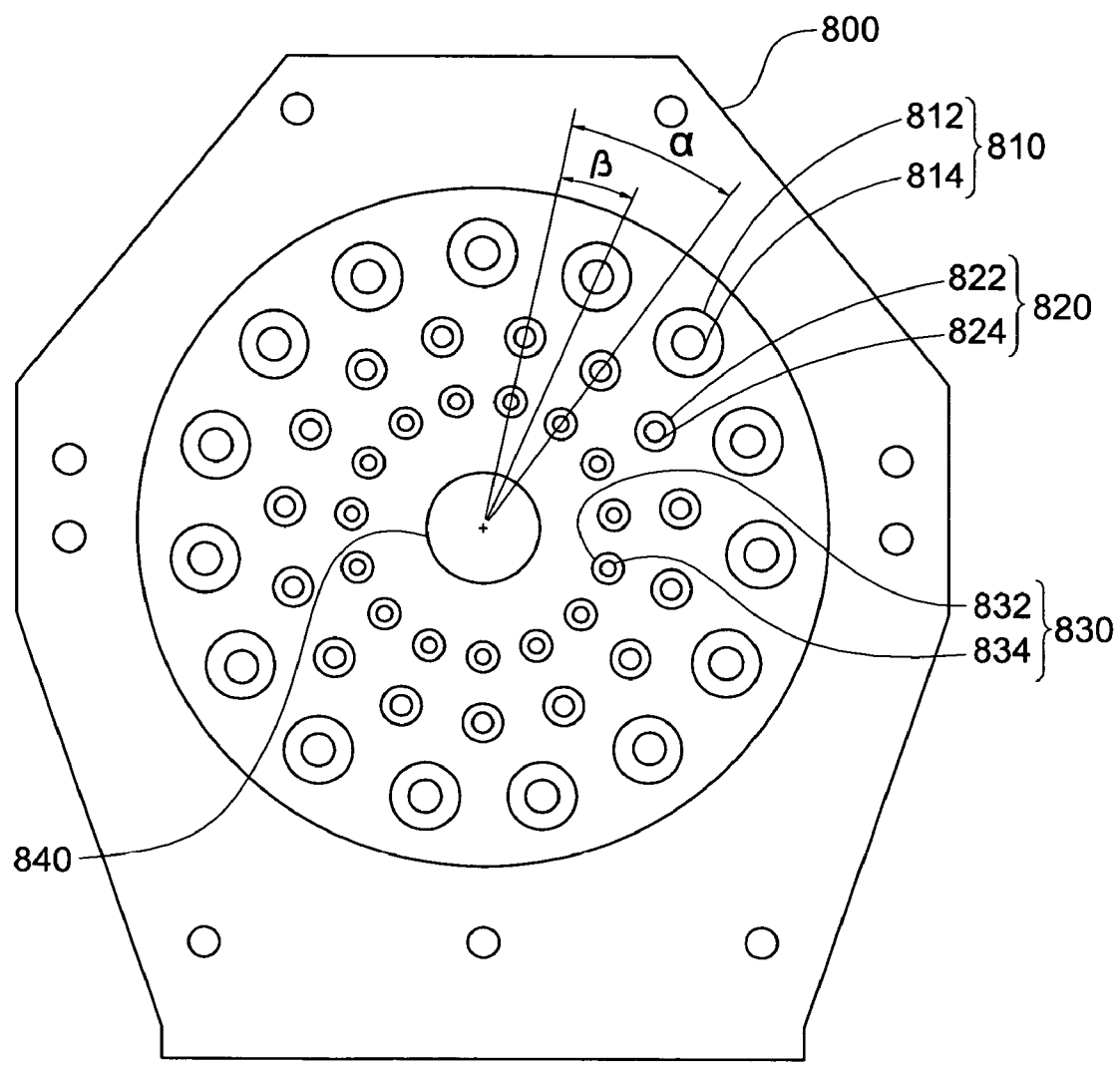
FIG. 5B is a schematic view of another exemplary stator of a multivariable generator corresponding to the exemplary rotor of FIG. 5A according to the present invention.

FIG. 5B is a schematic view of another exemplary stator of a multivariable generator corresponding to the exemplary rotor of FIG. 5A according to the present invention. In FIG. 5B, the stator 800 may include a first plurality of coil members 810 distributed to be equally spaced apart along a first radius R1 around the stator 800 similar to the distribution of the first plurality of magnetic sources 712 along the first radius R1 around the rotor 700 (in FIG. 5A). Accordingly, each of the first plurality of coil members 810 may be mutually spaced apart from each other by a distance corresponding to the center of each of the first plurality of magnetic sources 712.

In FIG. 5B, the stator 800 may include a second plurality of coil members 820 distributed to be equally spaced apart along a second radius R2 around the stator 800 similar to the distribution of the second plurality of magnetic sources 722 along the second radius R2 around the rotor 700 (in FIG. 5A). Accordingly, each of the second plurality of coil members 820 may be mutually spaced apart from each other by a distance corresponding to the center of each of the second plurality of magnetic sources 722.

In FIG. 5B, the stator 800 may include a third plurality of coil members 830 distributed to be equally spaced apart along a third radius R3 around the stator 800 similar to the distribution of the third plurality of magnetic sources 732 along the third radius R3 around the rotor 700 (in FIG. 5A). Accordingly, each of the third plurality of coil members 830 may be mutually spaced apart from each other by a distance corresponding to the center of each of the third plurality of magnetic sources 732.

In FIG. 5B, spacings between each of the first, second, and third radii R1, R2, and R3 may be determined by each of the diameters d1, d2, and d3 of the first, second, and third pluralities of magnetic sources 712, 722, and 732 (in FIG. 5A). Furthermore, the coil winding portions of each of the first, second, and third coil members 810, 820, and 830 may determine the spacings between each of the first, second, and third radii R1, R2, and R3. Accordingly, the spacings between each of the first, second, and third radii R1, R2, and R3 may be scaled up or scaled down based upon an overall physical size of the electrical generator.

In FIG. 5B, each of the first, second, and third pluralities of coil members 810, 820, and 830 are radially disposed to be mutually separated by an angle α of about 24.0 degrees (i.e., 360 degrees/15 coil members). In addition, the radial placement of the first plurality of coil members 810 may be offset from the second and third pluralities of coil members 820 and 830, by an angle β that may be between about 0 degrees and 24.0 degrees. Accordingly, different frequencies may be produced by the first plurality of coil members/magnetic sources than the frequencies produced by the second and third pluralities of coil members/magnetic sources.

In each of FIGS. 2A-5B, various combinations of offsets may be used. Specifically, in order to accommodate large diameter magnet sources/coil members, the offset angles β may be varied in order to provide desired electrical outputs from the coil members. Moreover, multiple offset angles β may be incorporated in the rotor and stators to provide an electrical generator capable of producing specific relative outputs.

According to the present invention, each of the rotors and stator pairs may have diameters larger than those shown in FIGS. 2A-5B. For example, if each of the rotors and stator pairs where to include more than three concentric rings of magnetic sources and coil members, then the diameters of the rotors and stator pairs would increase proportionally. Accordingly, diameters of the rotors and stator pairs may be ultimately as large as a house, for example, or even larger. Thus, the exemplary rotor and stator pairs shown in FIGS. 2A-5B are not to be considered limiting with respect to the present invention, but merely demonstrate basic exemplary configurations for the rotor and stator pairs.

FIG. 6 is an enlarged view of section A of FIG. 1 showing a schematic view of an exemplary coil member of an electrical generator according to the present invention. In FIG. 6, a coil member 210 may be embedded within the stator 200. The coil member 210 may include the coil winding portion 212 and the core portion 214, wherein the coil winding portion 212 may extend from the exterior surface 260 of the stator 200 by a distance X1, and the core portion may extend from the exterior surface 260 of the stator 200 by a distance X4 and may extend from the end portion of the coil winding portion 212 by a distance X3. In addition, another end portion of the coil winding portion 212 may be offset from the interior surface 250 of the stator 200 by a distance X2. Of course, each of the distances X1, X2, X3, and X4 may be varied based upon the desired output from the electrical generator. Specifically, in order to minimize electrical/magnetic interference between adjacent coil members and/or adjacent magnetic sources, any of the distances X1, X2, X3, and X4 may be varied.

As shown in FIG. 6, an outermost diameter Y1 of the coil winding portion 212 may be slightly less than a hole having a diameter Y2. Accordingly, the diameter Y2 of the hole in the stator 200 may be varied depending upon the outermost diameter Y1 of the coil winding portion 212, or may be varied depending upon neighboring coil members disposed along the first radius R1 (in FIGS. 2B, 3B, 4B, and 5B) or upon neighboring coil members disposed along the second or third radii R2 and R3 (in FIGS. 2B, 3B, 4B, and 5B). Furthermore, the diameter Y2 may be dependent upon the diameter d1 of the core portion 214 and/or the number of coil windings and wire diameter of the coil winding portion 212.

In FIG. 6, the core portion 214 may be formed of amorphous or microcrystalline material in order to reduce/eliminate the heat produced by the alternating magnet field induced to the core portion of the coil member. For example, Manganese Zinc (MnZn) Ferrite powder (about 400 mesh) may be molded into the required shape of the core portion of the coil member. Then, the molded manganese zinc ferrite material may be sintered into a solid core structure. Accordingly, the sintered core structure may be wound with wire along a portion of the length of the sintered core structure. For example, as shown in FIG. 6, the coil winding portion 212 may be offset from end portions of the core portion 214.

The manganese zinc ferrite powder used to form the core portion 214 may comprise about 10% to about 90% Iron, Manganese, and Zinc. Accordingly, the core portion 214 may be produced having a 50 kHz rating, such that the core may not produce any heat operating at a frequency of about 400 Hz and about 800 Hz. Furthermore, since the MnZn Ferrite material used to form the core portion 214 has a relatively high permeability, the magnetic field may be easily induced to the core portion 214. Similarly, as the magnetic field is withdrawn from the core portion 214, the induced magnetic field within the core portion 214 is easily diminished. Thus, the MnZn Ferrite material does not exhibit any appreciable remnant magnetic polarization.

Figure 7:
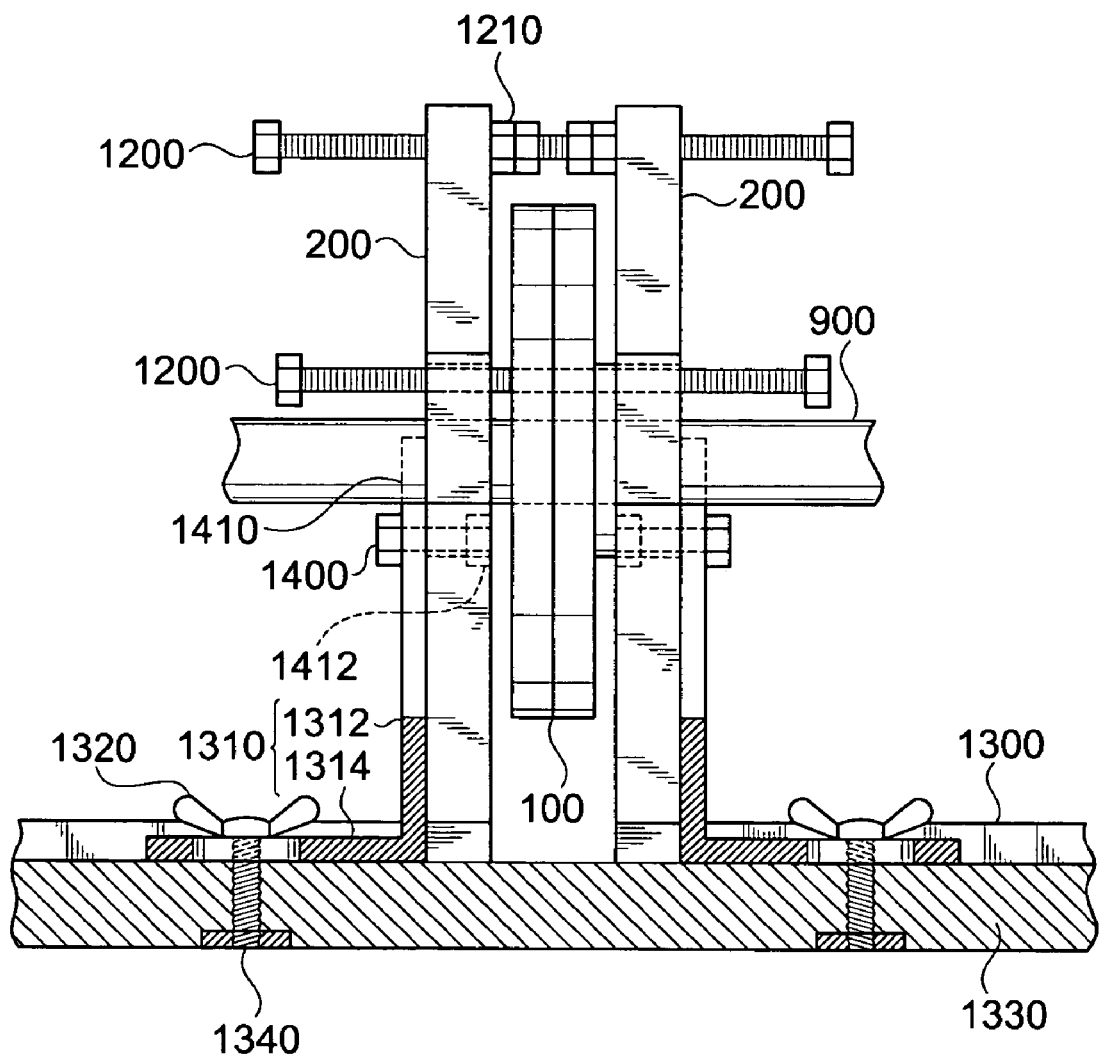
FIG. 7 is a schematic view of an exemplary assembled electrical generator according to the present invention.

FIG. 7 is a schematic view of an exemplary assembled electrical generator according to the present invention. In FIG. 7, assembly of an electrical generator may include positioning both of the stators 200 to sandwich the rotor 100 with a relatively small distance between each. For example, positioning of the stators 200 with the rotor 100 may be accomplished so as to provide a distance within a range of a few thousandths of an inch or larger between the respective faces of the core portions 214, 224, and 234 (in FIG. 2B) and the magnetic sources 112, 122, and 132 (in FIG. 2A). Thus, the distance between the faces of the core portions 214, 224, and 234 and the magnetic sources 112, 122, and 132 may be adjusted by use of adjusting fasteners 1200 and 1210 that may be distributed along the outermost circumference of the stators 200 and extend through the stators 200. In addition, a double fastener pair 1400 and 1412 may used in conjunction with the adjusting fasteners 1200 and 1210 to provide a positively locked assembly.

In FIG. 7, the double fastener pair 1400 and 1412 may be provided to mechanically affix the stators 200 to a base member 1330 using a plurality of base fastener pairs 1320 and 1340. Each of the double fastener pairs 1400 and 1412 may extend through holes at an upper portion 1312 of a frame member 1310 into a portion of the stators 200 to be fastened to a stator fastener 1412 provided at the interior surface 250 (in FIG. 1) of the stator 200. Accordingly, a lower portion 1314 of the frame member 1310 may be affixed to the base member 1330 using the plurality of base fastener pairs 1320 and 1340.

Figure 8A:
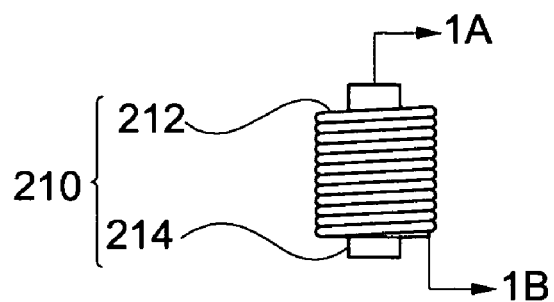
FIG. 8 is a schematic view of an exemplary electrical interconnection of coil members according to the present invention.
Figure 8B:
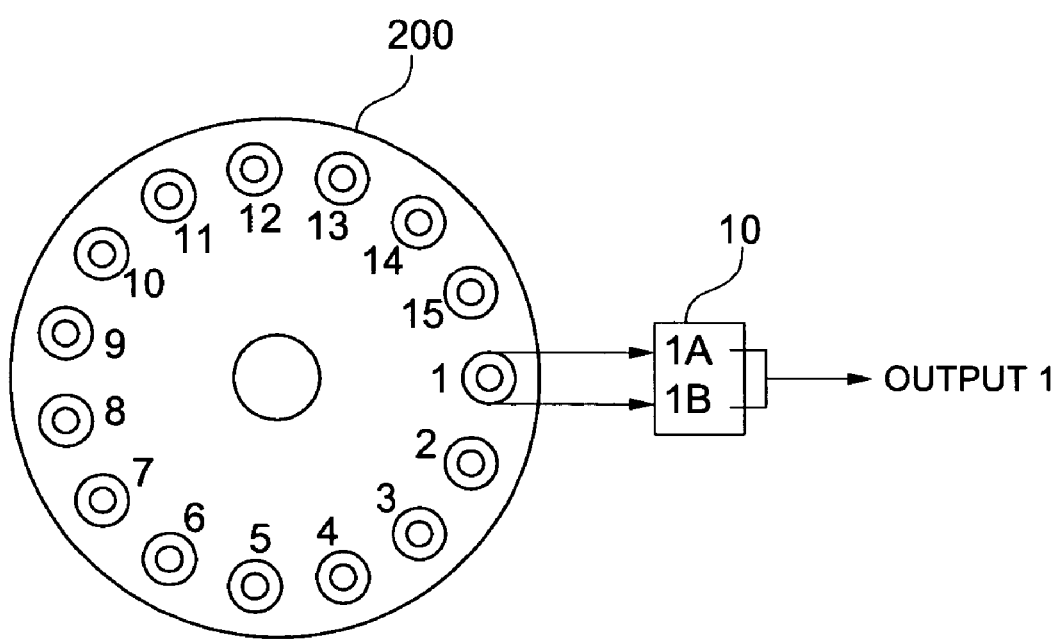
Figure 9:
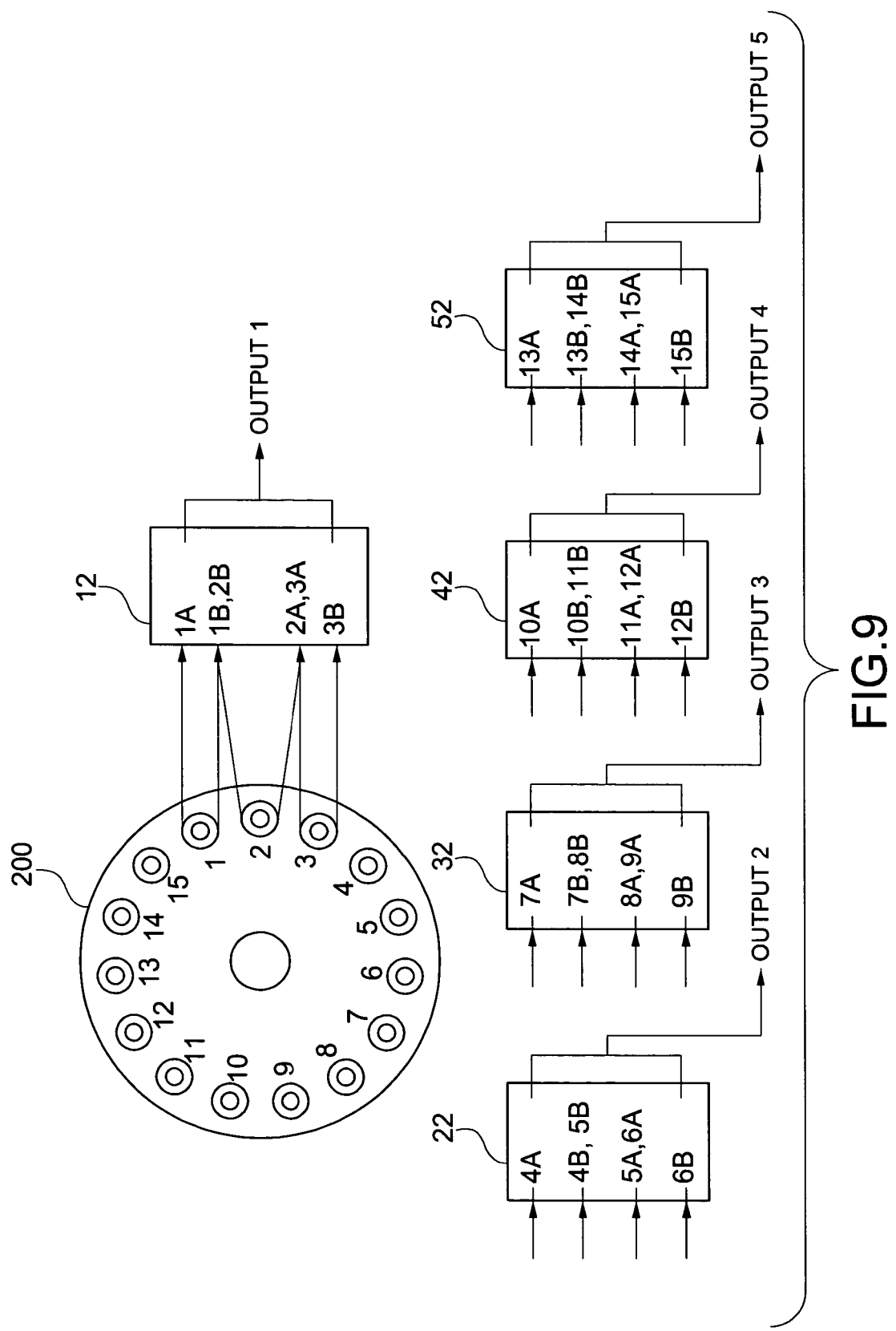
FIG. 9 is a schematic view of another exemplary electrical interconnection of coil members according to the present invention.
Figure 10:
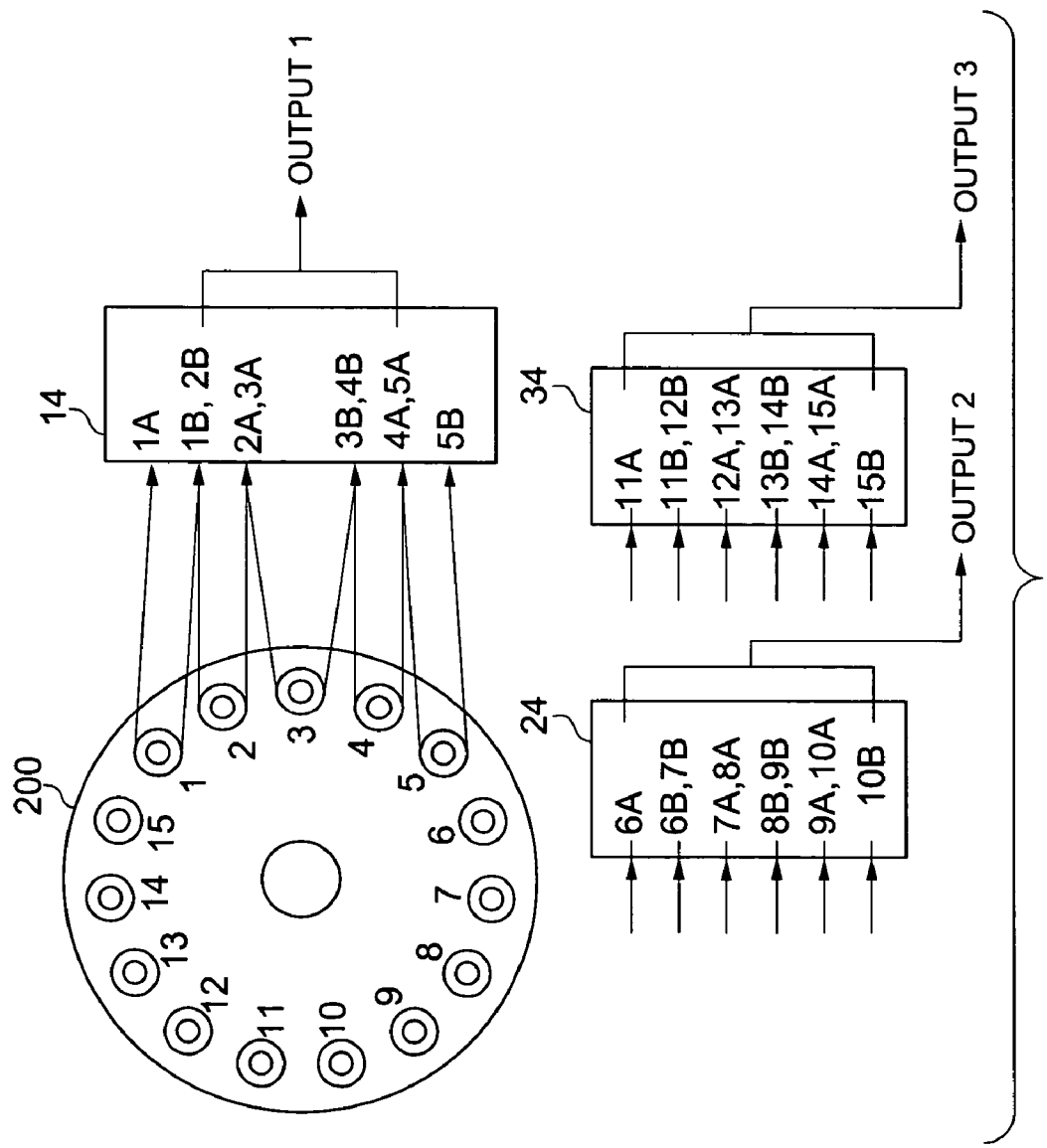
FIG. 10 is a schematic view of another exemplary electrical interconnection of coil members according to the present invention.

FIGS. 8, 9, and 10 are schematic views of exemplary electrical interconnections of coil members according to the present invention. In FIG. 8A, an exemplary coil member 210 is shown having the coil winding portion 212 and the core portion 214. For purposes of convention, each of the coiling winding portions 212 includes a center wire portion 1A and an outer wire portion 1B. Accordingly, as shown in FIG. 8B, a 30-phase output configuration may be used, where each of the 15 coil members of each of both of the rotors 200 are individually connected to provide single outputs 1-30. Specially, a first terminal block 10 may includes a first connection receiving the center wire portion 1A of the first coil member 1, and a second connection receiving the outer wire portion 1B of the first coil member 1. Accordingly, the terminal block 12 includes an output connection connected between the center wire portion 1A and the outer wire portion of the first coil member 1 in order to produce OUTPUT 1.

Alternatively, other electrical interconnections of the coil members may be implemented. For example, different series/parallel interconnections of the coil members may provide for various voltage/current outputs. Accordingly, the exemplary electrical configurations shown in FIGS. 8, 9, and 10 may not be considered exclusively for the purpose of explanation of the present invention. Thus, disclosure and illustration of all possible electrical configurations is not reasonable for purposes of explaining the present invention. However, all possible electrical configurations may be considered to be implied or suggested by the present invention.

In FIG. 9, a preferable 10-phase output configuration may be used, wherein groups of three adjacent coil members 1-3 may be electrically interconnected to provide a single output 1. Specifically, a first terminal block 12 may include a first connection receiving the center wire portion 1A of the first coil member 1, a second connection receiving the outer wire portions 1B and 2B of the first and second coil members 1 and 2, a third connection receiving the center wire portions 2A and 3A of the second and third coil members 2 and 3, and a fourth connection receiving the outer wire portion 3B of the third coil member 3. Accordingly, the terminal block 12 includes an output connection connected between the center wire portion 1A of the first coil member 1 and the outer wire portion 3B of the third coil member 3 in order to produce OUTPUT 1.

In FIG. 9, second, third, fourth, and fifth terminal blocks 22, 32, 42, and 52 are provided in order to channel/route the center and outer wire portions of the coil members. Specifically, the second terminal block 22 routes the center and outer wire portions 4A/4B, 5A/5B, and 6A/6B of the fourth, fifth, and sixth coil members 4, 5, and 6 in order to produce OUTPUT 2. Similarly, the third terminal block 32 routes the center and outer wire portions 7A/7B, 8A/8B, and 9A/9B of the seventh, eighth, and ninth coil members 7, 8, and 9 in order to produce OUTPUT 3. Likewise, the fourth terminal block 42 routes the center and outer wire portions 10A/10B, 11A/11B, and 12A/12B of the tenth, eleventh, and twelfth coil members 10, 11, and 12 in order to produce OUTPUT 4. Finally, the fifth terminal block 52 routes the center and outer wire portions 13A/13B, 14A/14B, and 15A/15B of the thirteenth, fourteenth, and fifteenth coil members 13, 14, and 15 in order to produce OUTPUT 5.

In FIG. 9, each of the outputs OUTPUT 1, 2, 3, 4, and 5 may be further conditioned or modified in order to provide voltage a current. In addition, each of the outputs OUTPUT 1, 2, 3, 4, and 5 may be applied to individual or groups of electrical loads.

In FIG. 10, a 6-phase output configuration may be used, wherein groups of five adjacent coil members 1-5 may be electrically interconnected to provide a single output 1. Specifically, a first terminal block 14 may include a first connection receiving the center wire portion 1A of the first coil member 1, a second connection receiving the outer wire portions 1B and 2B of the first and second coil members 1 and 2, a third connection receiving the center wire portions 2A and 3A of the second and third coil members 2 and 3, a fourth connection receiving the outer wire portions 3B and 4B of the third and fourth coil members 3 and 4, a fifth connection receiving the center wire portions 4A and 5A of the fourth and fifth coil members 4 and 5, and a sixth connection receiving the outer wire portion of the fifth coil member 5. Accordingly, the terminal block 14 includes an output connection connected between the center wire portion 1A of the first coil member 1 and the outer wire portion 3B of the fifth coil member 5 in order to produce OUTPUT 1.

In FIG. 10, second and third terminal blocks 24 and 34 are provided in order to channel/route the center and outer wire portions of the coil members. Specifically, the second terminal block 24 routes the center and outer wire portions 6A/6B, 7A/7B, 8A/8B, 9A/9B, and 10A/10B of the sixth, seventh, eighth, ninth, and tenth coil members 6-10 in order to produce OUTPUT 2. Similarly, the third terminal block 34 routes the center and outer wire portions 11A/11B, 12A/12B, 13A/13B, 14A/14B, and 15A/15B of the eleventh, twelfth, thirteenth, fourteenth, and fifteenth coil members 11-15 in order to produce OUTPUT 3.

Figure 11:
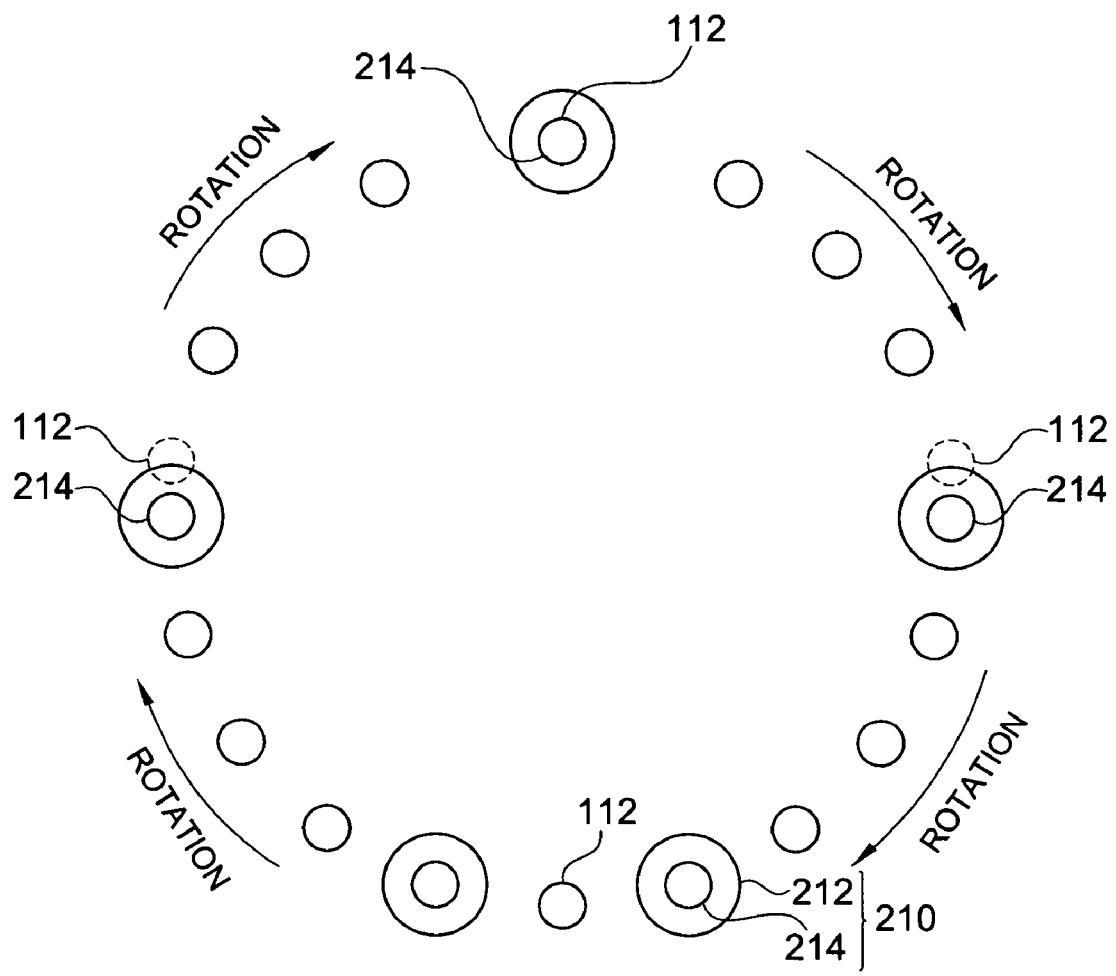
FIG. 11 is a schematic view of an exemplary method of generating electrical energy according to the present invention.

FIG. 11 is a schematic view of an exemplary method of generating electrical energy according to the present invention. In FIG. 11, a method of generating electrical energy may involve rotation of a rotor 100 (in FIG. 1), for example, between adjacent stators 200 (in FIG. 1). Accordingly, as the rotor 100 rotates, the magnetic sources 112 pass by second end portions 224 of cores 214. However, as the rotor 100 rotates, only a single magnetic source 112 is aligned with any one of the second portion 224 of a core 214. Thus, as the rotor 100 rotates, the magnetic sources 112 become aligned with corresponding cores 214. For example, as the magnetic source 112 is aligned with the second end portion 224 of the core 214, at an upper portion of the rotor 100, then another magnetic source 112 at a lower portion of the rotor 100 may be positioned between adjacent coiling members 210. When the magnetic source 112 is aligned with the second end portion 224 of the core 214, at the upper portion of the rotor 100, then the magnetic source 112 imparts a magnetic moment to core 214 that is equal to the N/S/polarity of the magnetic source 112. Then, a current is induced to the coiling winding portion 212 of the coil member 210, and an electrical output is produced and transmitted along conductive leads (not shown) of the coil winding portion 212. Then, the electrical output is transmitted to a controller (not shown) for further processing.

Similarly, as shown in FIG. 11, at side portions of the rotor 100, magnetic sources 112 may be coming into and out of alignment with corresponding coil members 210. Therefore, as the rotor 100 rotates, electrical energy may be sequentially produced by the coil members 210. In addition, since rotation of the rotor 100 may be varied, then the electrical energy produced by the coil members 210 may be varied. For example, frequency, voltage, and amperage of the electrical energy may be varied. Furthermore, the controller (not shown) may further vary the electrical energy produced by the coil members 210.

Figure 12:
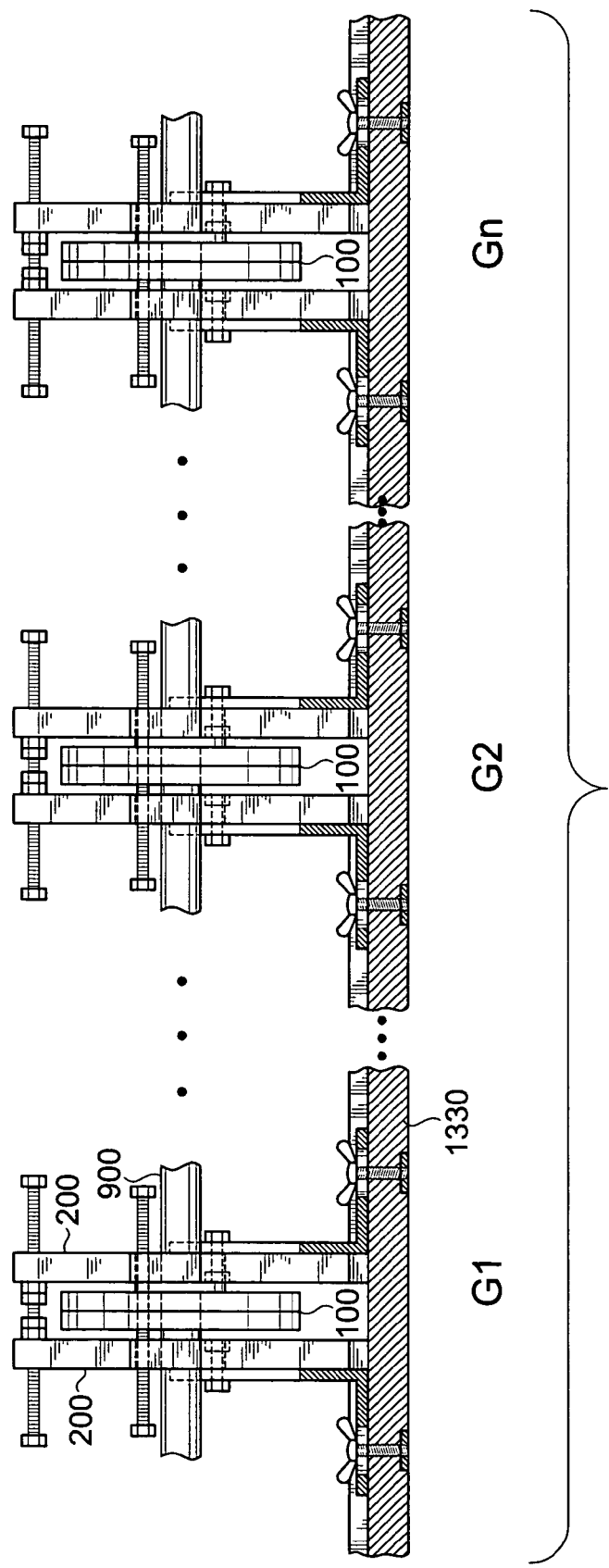
FIG. 12 is a schematic view of an exemplary electrical generator providing multiple variable voltage/current outputs.

FIG. 12 is a schematic view of an exemplary electrical generator providing multiple variable voltage/current outputs. In FIG. 12, a plurality G1, G2, . . . Gn of the exemplary electrical generator, as shown in FIG. 7, may be provided along a common base 1330. Accordingly, a common rotating shaft 900 may mechanically couple each of the rotors 100 to rotate at a common speed. Alternatively, the rotating shaft 900 may comprise a plurality of half-shafts in order to facilitate interchanging of the rotors 100 and stators 200 without disturbing adjacent ones of the plurality of electrical generators G1, G2, . . . Gn. Thus, the configuration of the plurality of electrical generators G1, G2, . . . Gn may allow for each of the plurality of electrical generators G1, G2, . . . Gn to produce different voltage, current, and/or frequency outputs by rotation of the rotating shaft 900. In either case, each of the plurality of electrical generators G1, G2, . . . Gn may individually be reconfigurable by interchanging the rotors 100 and corresponding stator pairs 200.

It will be apparent to those skilled in the art that various modifications and variations can be made in the multivariable generator and method using a multivariable generator of the present invention without departing from the spirit or scope of the invention. Thus, it is intended that the present invention cover the modifications and variations of this invention provided they come within the scope of the appended claims and their equivalents.

What is claimed is:

1. A generator device for generating electrical energy, comprising:
a rotor having a first set of even-numbered magnetic sources distributed along a first radius of the rotor; and
a first pair of stators, each having a first set of odd-numbered coil members distributed along a first radius of the stator, the stators disposed adjacent to opposing side portions of the rotor,
wherein each coil member includes a core portion having an amorphous structure;
each core portion includes at least one of manganese, zinc, and ferrite material; and
the core portion includes a first end portion flush with an interior surface of the stator, and a second end portion extending from an exterior surface of the stator.

2. The generator according to claim 1, wherein the each of the coil members includes a coil winding having a first end portion extending from the exterior surface of the stator and a second end portion extending into the stator.

3. The generator according to claim 2, where the second end portion of the amorphous core extends past the first end portion of the coil winding.

4. The generator according to claim 3, wherein the stator is disposed between the rotor and the interconnection ring.

5. A generator device for generating electrical energy, comprising:
a rotor having a first set of even-numbered magnetic sources distributed along a first radius of the rotor;
a first pair of stators, each having a first set of odd-numbered coil members distributed along a first radius of the stator, the stators disposed adjacent to opposing side portions of the rotor;
a frame member coupled to the first pair of stators; and
a pair of alignment rails adjacent to the frame member to align the first pair of stators with the rotor,
wherein each coil member includes a core portion having an amorphous structure.

6. The generator according to claim 5, wherein the frame member is adjustably coupled to the base member via a plurality of slots extending along a direction of the pair of alignment rails.

7. The generator according to claim 5, wherein the first pair of stators are replaceable with a second pair of stators having a second set of odd-numbered coils different from the first set of odd-numbered coils.

8. A generator device for generating electrical energy, comprising:
a rotor having a first set of even-numbered magnetic sources distributed along a first radius of the rotor; and
a first pair of stators, each having a first set of odd-numbered coil members distributed along a first radius of the stator, the stators disposed adjacent to opposing side portions of the rotor, wherein each coil member includes a core portion having an amorphous structure,
wherein each of the stators includes a second plurality of coil members disposed along a second radius different from the first radius.

9. The generator according to claim 8, wherein each of the stators includes a third plurality of coil members disposed along a third radius different from the first and second radii.

10. A generator device for generating electrical energy, comprising:
a rotor having a first set of even-numbered magnetic sources distributed along a first radius of the rotor; and
a first pair of stators, each having a first set of odd-numbered coil members distributed along a first radius of the stator, the stators disposed adjacent to opposing side portions of the rotor, wherein each coil member includes a core portion having an amorphous structure, wherein the rotor further includes a second set of even-numbered magnetic sources distributed along a second radius of the rotor different from the first radius.

11. The generator according to claim 10, wherein the rotor further includes a third set of even-numbered magnetic sources distributed along a third radius of the rotor different from the first and second radii.

12. A generator device for generating electrical energy, comprising:

a rotor having a first set of even-numbered magnetic sources distributed along a first radius of the rotor; and a first pair of stators, each having a first set of odd-numbered coil members distributed along a first radius of the stator, the stators disposed adjacent to opposing side portions of the rotor, wherein each coil member includes a core portion having an amorphous structure, wherein each of the stators includes a second plurality of coil members disposed along a second radius of the stator and a third plurality of coil members disposed along a third radius of the stator different from the first and second radii, and the rotor includes a second set of even-numbered magnetic sources distributed along a second radius of the rotor and a third set of even-numbered magnetic sources distributed along a third radius of the rotor different from the first and second radii.

13. The generator according to claim 12, wherein the first, second, and third radii of the stator is equal to the first, second, and third radii of the rotor, respectively.

14. The generator according to claim 12, wherein each diameter of the second set of even-numbered magnetic sources is less than each diameter of the first set of even-numbered magnetic sources and greater than each diameter of the third set of even-numbered magnetic sources.

15. The generator according to claim 12, wherein each of the first coil members have first core portions having a first diameter, each of the second coil members have second core portions having a second diameter, and each of the third coil members have third core portions having a third diameter.

16. The generator according to claim 15, wherein the second diameter is less than the first diameter and greater than the third diameter.

17. The generator according to claim 15, wherein each diameter of the first set of even-numbered magnetic sources is equal to the first diameter of the first core portions, each diameter of the second set of even-numbered magnetic sources is equal to the second diameter of the second core portions, and each diameter of the third set of even-numbered magnetic sources is equal to the third diameter of the third core portions.

18. An apparatus for generating electrical energy, comprising: a rotor having a first even number of magnetic sources disposed along a first radius of the rotor, a second even number of magnetic source disposed along a second radius of the rotor less than the first radius, and a third even number of magnetic sources disposed along a third radius of the rotor less than the first and second radii; and a first pair of stators disposed along opposing sides of the rotor, each of the stators having a first odd number of coil members disposed along a first radius of the stator, a second odd number of coil member disposed along a second radius of the stator less than the first radius, and a third odd number of coil members disposed along a third radius of the stator less than the first and second radii, wherein each of the first, second, and third odd number of coil members extend through the stator along a direction opposite to the rotor.

19. The apparatus according to claim 18, wherein each of the first even number of magnetic sources have a first diameter, each of the second even number of magnetic sources have a second diameter less than the first diameter, and each of the third even number of magnetic sources have a third diameter less than the first and second diameters.

20. The apparatus according to claim 18, wherein each of the first odd number of coil members include a first core portion having a first diameter, each of the second odd number of coil members include a second core portion having a second diameter less than the first diameter, and each of the third odd number of coil members include a third core portion having a third diameter less than the first and second diameters.

21. The apparatus according to claim 20, wherein each of the first, second, and third core portions include amorphous material.

22. The apparatus according to claim 21, wherein the amorphous material includes at least one of manganese, zinc, and ferrite material.

23. The apparatus according to claim 21, wherein the first, second, and third core portions include amorphous manganese zinc ferrite material.

24. The apparatus according to claim 18, wherein a first group of three of the first odd number of coil members are electrically interconnected to provide a first output, a second group of another three of the first odd number of coil members are electrically interconnected to provide a second output, a third group of another three of the first odd number of coil members are electrically interconnected to provide a third output, a fourth group of another three of the first odd number of coil members are electrically interconnected to provide a fourth output, and a fifth group of another three of the first odd number of coil members are electrically interconnected to provide a fifth output.

25. The apparatus according to claim 24, wherein the first, second, third, fourth, and fifth outputs are electrically connected to different loads.

26. The apparatus according to claim 24, wherein the first, second, third, fourth, and fifth outputs are electrically connected to similar loads.

* * * * *